(12) United States Patent
Miller et al.

(10) Patent No.: US 10,633,104 B2
(45) Date of Patent: Apr. 28, 2020

(54) HYBRID-ELECTRIC PROPULSION SYSTEM FOR AN AIRCRAFT

(71) Applicant: General Electric Company, Schenectady, NY (US)

(72) Inventors: Brandon Wayne Miller, Liberty Township, OH (US); Michael Thomas Gansler, Mason, OH (US); Sridhar Adibhatla, Glendale, OH (US); Daniel E. Bergsten, Topsfield, MA (US); Nicholas Adam Wagner, Revere, MA (US); David Allen Gutz, Wenham, MA (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 15/597,597

(22) Filed: May 17, 2017

(65) Prior Publication Data
US 2019/0002115 A1 Jan. 3, 2019

(51) Int. Cl.
 *B64D 35/08* (2006.01)
 *B64D 31/06* (2006.01)
 *B64D 27/16* (2006.01)
 *B64D 27/24* (2006.01)
 *B64D 27/02* (2006.01)

(52) U.S. Cl.
 CPC ........... *B64D 31/06* (2013.01); *B64D 27/16* (2013.01); *B64D 27/24* (2013.01); *B64D 35/08* (2013.01); *B64D 2027/026* (2013.01)

(58) Field of Classification Search
 CPC .......................... B64D 27/02; B64C 29/0025
 See application file for complete search history.

(56) References Cited

U.S. PATENT DOCUMENTS

| 4,968,942 A | 11/1990 | Palanisamy |
| 5,951,608 A | 9/1999 | Osder |
| 6,012,676 A | 1/2000 | Gold et al. |
| 7,791,347 B2 | 9/2010 | Rajpara et al. |
| 7,876,542 B2 | 1/2011 | Rozman et al. |
| 8,218,341 B2 | 7/2012 | Wiegman et al. |

(Continued)

FOREIGN PATENT DOCUMENTS

| DE | 10 2013 209388 A1 | 11/2014 |
| DE | 10 2013 209538 A1 | 11/2014 |

OTHER PUBLICATIONS

Extended European Search Report and Opinion issued in connection with corresponding EP Application No. 18171704.2 dated Sep. 17, 2018.

*Primary Examiner* — Philip J Bonzell
*Assistant Examiner* — Tye William Abell
(74) *Attorney, Agent, or Firm* — Dority & Manning, P.A.

(57) ABSTRACT

A method of operating a hybrid-electric propulsion system for an aircraft includes determining a flight phase parameter for the aircraft is equal to a first value, and operating the hybrid-electric propulsion system in an electric charge mode in response to determining the flight phase parameter for the aircraft is equal to the first value. The method also includes determining the flight phase parameter for the aircraft is equal to a second value different from the first value, and operating the hybrid-electric propulsion system in an electric discharge mode in response to determining the flight phase parameter for the aircraft is equal to the second value.

20 Claims, 14 Drawing Sheets

(56) References Cited

U.S. PATENT DOCUMENTS

| | | |
|---|---|---|
| 8,271,151 B2 | 9/2012 | Hasan et al. |
| 8,314,588 B2 | 11/2012 | Lazarovich et al. |
| 8,684,314 B2 | 4/2014 | Chaduc et al. |
| 9,221,535 B2 | 12/2015 | Gordon et al. |
| 9,248,908 B1 | 2/2016 | Luyks |
| 9,446,842 B2 | 9/2016 | Luyks |
| 9,527,507 B2 | 12/2016 | Oba et al. |
| 10,227,137 B2 * | 3/2019 | Huang .................. B64C 27/24 |
| 2015/0060601 A1 | 3/2015 | Nakagawa et al. |
| 2016/0023773 A1 * | 1/2016 | Himmelmann ........ B64D 27/10 60/778 |
| 2016/0107758 A1 | 4/2016 | Esteyne et al. |
| 2016/0257416 A1 * | 9/2016 | Himmelmann ........ B64D 27/02 |
| 2016/0304211 A1 * | 10/2016 | Swann ................... B64D 31/06 |
| 2016/0304214 A1 * | 10/2016 | Himmelmann ........ B64D 41/00 |
| 2016/0325629 A1 * | 11/2016 | Siegel .................... B64D 27/24 |
| 2016/0325830 A1 | 11/2016 | Waltner et al. |
| 2017/0081034 A1 | 3/2017 | Marrinan et al. |
| 2017/0166316 A1 * | 6/2017 | Zhou ..................... B64D 27/24 |
| 2017/0291712 A1 * | 10/2017 | Himmelmann ........... F02C 6/00 |
| 2018/0327109 A1 * | 11/2018 | Coat ....................... F01D 13/00 |

* cited by examiner

HYBRID-ELECTRIC PROPULSION SYSTEM FOR AN AIRCRAFT

FIELD

The present subject matter relates generally to a hybrid-electric propulsion system for an aircraft having an energy storage unit, and more particularly to a method for charging the energy storage unit of the hybrid-electric propulsion system.

BACKGROUND

A conventional commercial airplane generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage.

More recently, propulsion systems have been proposed of a hybrid-electric design. With these hybrid-electric propulsion systems, an electric machine driven by a turbomachine may provide electric power to an electric fan to power the electric fan. Similar hybrid electric propulsion systems have been proposed for other aircraft as well, such as for helicopters. Such hybrid electric propulsion systems may, or may not, include, e.g., an electric fan assembly. With each of these hybrid electric propulsion systems, however, during certain operations, the inventors of the present disclosure have discovered that it may be less desirable to draw power from the turbomachine to generate electrical power. Accordingly, a hybrid-electric propulsion system designed to coordinate drawing power from the turbomachine to generate electrical power would be useful.

BRIEF DESCRIPTION

Aspects and advantages of the invention will be set forth in part in the following description, or may be obvious from the description, or may be learned through practice of the invention.

In one exemplary aspect of the present disclosure, a method of operating a hybrid-electric propulsion system for an aircraft is provided. The method includes determining a flight phase parameter for the aircraft is equal to a first value, and operating the hybrid-electric propulsion system in an electric charge mode in response to determining the flight phase parameter for the aircraft is equal to the first value. Operating the hybrid-electric propulsion system in the electric charge mode includes driving the electric machine with a combustion engine to generate electrical power, driving a prime propulsor with the combustion engine to generate thrust, and charging an energy storage unit with at least a portion of the electrical power generated. The method also includes determining the flight phase parameter for the aircraft is equal to a second value different from the first value, and operating the hybrid-electric propulsion system in an electric discharge mode in response to determining the flight phase parameter for the aircraft is equal to the second value. Operating the hybrid-electric propulsion system in the electric discharge mode includes providing electrical power from the energy storage unit to at least one of an electric propulsor assembly to drive the electric propulsor assembly or to the electric machine to drive one or more components of the combustion engine.

In certain exemplary aspects operating the hybrid-electric propulsion system in the electric discharge mode includes providing electrical power from the energy storage unit to an electric motor of the electric propulsor assembly, the electric motor drivingly connected to a propulsor of the electric propulsor assembly.

In certain exemplary aspects the first value corresponds to the aircraft being in a takeoff flight phase, and wherein the second value corresponds to the aircraft being in a top of climb flight phase.

In certain exemplary aspects the first value corresponds to the aircraft being in a first cruise flight phase, and wherein the second value corresponds to the aircraft being in a second cruise flight phase.

In certain exemplary aspects the first value corresponds to a cruise flight phase, and wherein the second value corresponds to a descent flight phase.

In certain exemplary aspects the method further includes determining the flight phase parameter for the aircraft is equal to a third value; operating the hybrid-electric propulsion system in the electric charge mode in response to determining the flight phase parameter for the aircraft is equal to the third value; determining the flight phase parameter for the aircraft is equal to a fourth value; and operating the hybrid-electric propulsion system in the electric discharge mode in response to determining the flight phase parameter for the aircraft is equal to the fourth value.

For example, in in certain exemplary aspects the first value corresponds to the aircraft being in a takeoff flight phase, wherein the second value corresponds to the aircraft being in a top of climb flight phase, wherein the third value corresponds to the aircraft being in a cruise flight phase, and wherein the fourth value corresponds to the aircraft being in a descent flight phase.

In certain exemplary aspects, the method may further include modifying operation of the combustion engine in response to determining the flight phase parameter for the aircraft is equal to the second value. For example, in certain exemplary aspects, modifying operation of the combustion engine includes operating the combustion engine in an idle or sub-idle mode. For example, in certain exemplary aspects the combustion engine is a first combustion engine, wherein the prime propulsor is a first prime propulsor, wherein the electric machine is a first electric machine, and wherein modifying operation of the first combustion engine further includes operating a second combustion engine of the hybrid-electric propulsion system in a high power mode to mechanically drive a second prime propulsor and further to drive a second electric machine to generate electrical power.

In certain exemplary aspects determining the flight phase parameter for the aircraft is equal to the first value includes determining the value of the flight phase parameter based on a performance map for the aircraft.

In certain exemplary aspects determining the flight phase parameter for the aircraft is equal to the first value includes determining one or more operational parameters of the aircraft, and determining a value of the flight phase parameter based at least in part on the determined operational parameter of the aircraft. For example, in certain exemplary aspects the one or more operational parameters of the aircraft includes one or more of an altitude of the aircraft, a change in altitude of the aircraft, an air speed of the aircraft, a change in airspeed of the aircraft, or a duration of a current flight of the aircraft.

In certain exemplary aspects the energy storage unit includes one or more batteries.

In certain exemplary aspects the aircraft is a helicopter, wherein the combustion engine is a turboshaft engine, and wherein the prime propulsor is a main rotor assembly. For example, in certain exemplary aspects operating the hybrid-electric propulsion system in the electric discharge mode including providing electrical power from the energy storage unit to the electric machine to increase an effective power output of an output shaft of the turboshaft engine. For example, in certain exemplary aspects the first value corresponds to the aircraft being in a descent flight phase, wherein the second value corresponds to the aircraft being in an ascent flight phase. For example, in certain exemplary aspects the turboshaft engine includes an output shaft and a low pressure shaft mechanically coupled to the output shaft, and wherein operating the hybrid-electric propulsion system in the electric charge mode includes driving the electric machine with the turboshaft engine to generate electrical power to reduce a rotational speed of the output shaft, the low pressure shaft, or both.

In an exemplary embodiment of the present disclosure, a hybrid-electric propulsion system for an aircraft is provided. The hybrid electric propulsion system includes an electric machine, a prime propulsor, a combustion engine mechanically coupled to the prime propulsor for driving the prime propulsor and further coupled to the electric machine, an electrical energy storage unit electrically connectable to the electric machine, and an electric propulsor assembly electrically connectable to the electrical energy storage unit, the electric machine, or both. The hybrid electric propulsion system also includes a controller having memory and one or more processors, the memory storing instructions that when executed by the one or more processors cause the hybrid-electric propulsion system to perform functions. The functions include determining a flight phase parameter for the aircraft is equal to a first value, and operating the hybrid-electric propulsion system in an electric charge mode in response to determining the flight phase parameter for the aircraft is equal to the first value. Operating the hybrid-electric propulsion system in the electric charge mode includes driving the electric machine with the combustion engine to generate electrical power, driving the prime propulsor with the combustion engine to generate thrust, and charging the energy storage unit with at least a portion of the electrical power generated. The functions also include determining the flight phase parameter for the aircraft is equal to a second value different from the first value, and operating the hybrid-electric propulsion system in an electric discharge mode in response to determining the flight phase parameter for the aircraft is equal to the second value. Operating the hybrid-electric propulsion system in the electric discharge mode including providing electrical power from the energy storage unit to the electric propulsor assembly to drive the electric propulsor assembly.

In another exemplary embodiment of the present disclosure, a hybrid electric propulsion system for an aircraft is provided. The hybrid electric propulsion system includes an electric machine, a main rotor assembly, a turbomachine mechanically coupled to the main rotor assembly for driving the main rotor assembly and further coupled to the electric machine, and an electrical energy storage unit electrically connectable to the electric machine. The hybrid electric propulsion system also includes a controller including memory and one or more processors, the memory storing instructions that when executed by the one or more processors cause the hybrid-electric propulsion system to perform functions. The functions include determining a flight phase parameter for the aircraft is equal to a first value, and operating the hybrid-electric propulsion system in an electric charge mode in response to determining the flight phase parameter for the aircraft is equal to the first value. Operating the hybrid-electric propulsion system in the electric charge mode including driving the electric machine with the turbomachine to generate electrical power, driving the main rotor assembly with the turbomachine to generate thrust, and charging the energy storage unit with at least a portion of the electrical power generated. The functions also include determining the flight phase parameter for the aircraft is equal to a second value different from the first value, and operating the hybrid-electric propulsion system in an electric discharge mode in response to determining the flight phase parameter for the aircraft is equal to the second value. Operating the hybrid-electric propulsion system in the electric discharge mode including providing electrical power from the energy storage unit to the electric machine to drive one or more components of the turbomachine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
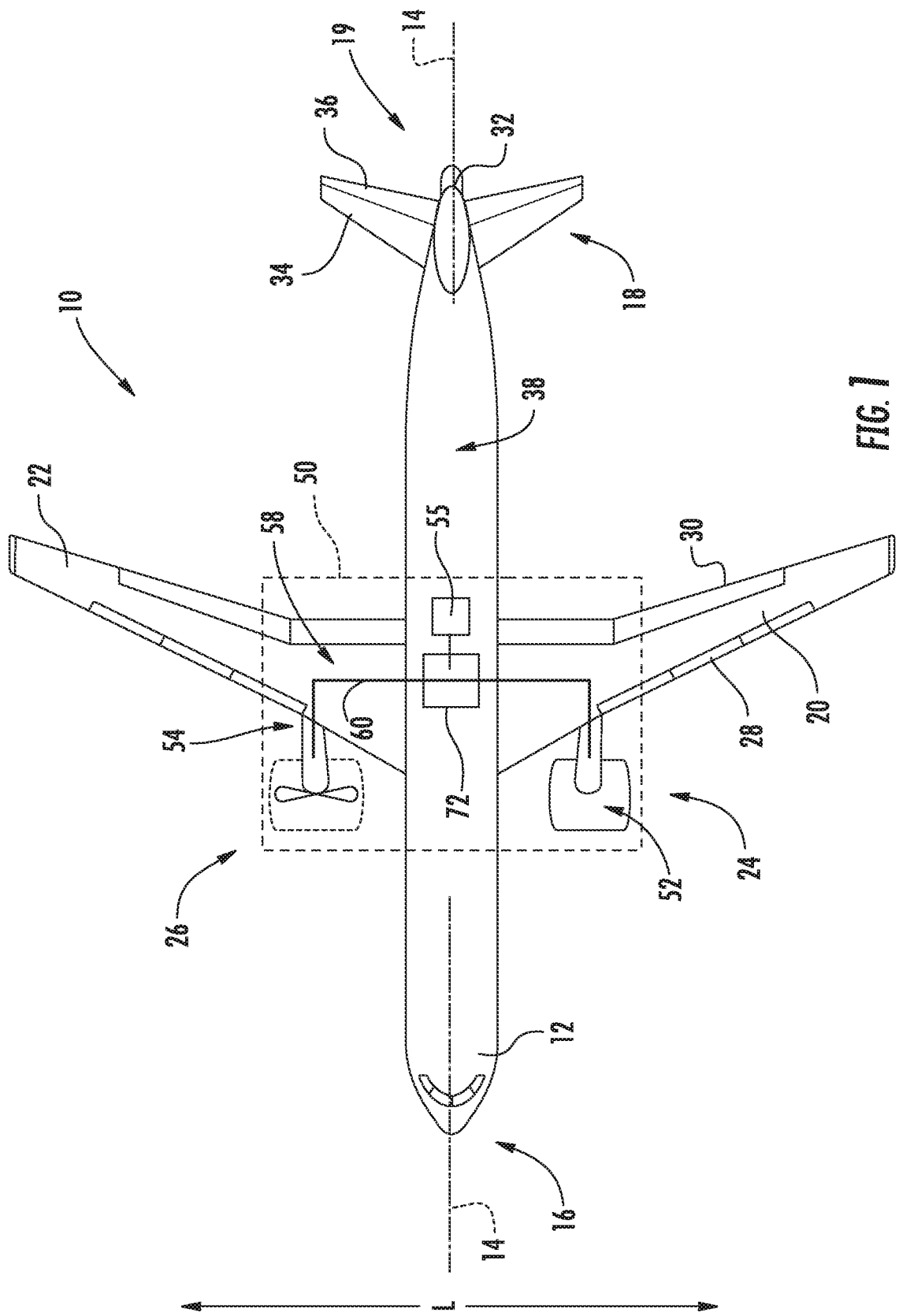
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction to which the fluid flows. However, the terms "upstream" and "downstream" as used herein may also refer to a flow of electricity.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Certain embodiments of the present disclosure generally provide for a hybrid-electric propulsion system having a combustion engine-driven electric machine, an energy storage unit, and optionally an electric propulsor assembly. The energy storage unit it is configured to both receive and store electrical power from the electric machine, as well as provide stored electrical power to one or both of the electric propulsor assembly to drive the electric propulsor assembly and back to the electric machine to drive, or assist with driving, one or more components of the combustion engine. The present disclosure further provides for a method for determining when to operate the hybrid-electric propulsion system in a charge mode (wherein electrical power is provided from the electric machine to the energy storage unit) versus a discharge mode (wherein electrical power is provided from the energy storage unit to the electric propulsor assembly and/or back to the electric machine).

In certain exemplary aspects, the method generally makes control decisions regarding the charging or discharging of electrical power from the energy storage unit based on a flight phase of the aircraft. For example, the method may first determine the aircraft is in a first flight phase (i.e., a flight phase parameter for the aircraft is equal to a first value). In response, the method may operate the hybrid-electric propulsion system in the electric charge mode to charge the energy storage unit with at least a portion of the electrical power generated by the electric machine. Subsequently, the method may determine the aircraft is in a second flight phase (i.e., the flight phase parameter for the aircraft is equal to a second value). In response, the method may operate the hybrid-electric propulsion system in the electric discharge mode to provide electrical power stored within the energy storage unit to one or both of the electric propulsor assembly (if included) or back to the electric machine.

As will be discussed herein, there may be any suitable number of flight phases for a particular flight, with the hybrid-electric propulsion system, e.g., alternating between the electric charge mode and electric discharge mode with each flight phase. Further, the method may determine which flight phase the aircraft is in (i.e., a value of flight phase parameter), in any suitable manner. For example, the method may determine the value of the flight phase parameter based on a performance map for the particular aircraft and/or for the particular flight, by one or more operational parameters of the aircraft, or a combination thereof.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and an empennage 19 at the aft end of the aircraft 10. Additionally, the aircraft 10 includes a wing assembly including a first, port side wing 20 and a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes, or rather, the empennage 19 of the aircraft 10 includes, a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
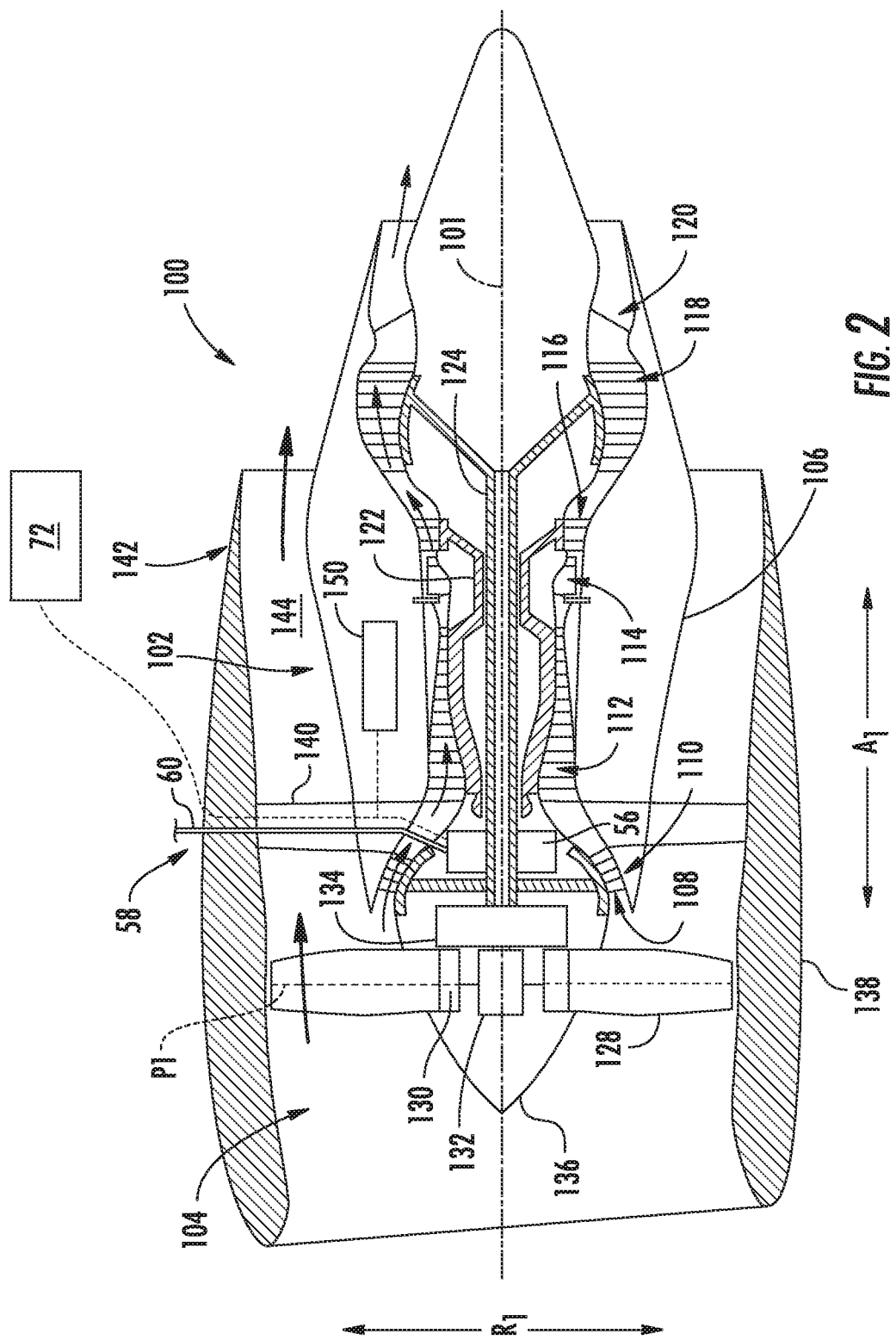
FIG. 2 is a schematic, cross-sectional view of a gas turbine engine mounted to the exemplary aircraft of FIG. 1.
Figure 3:
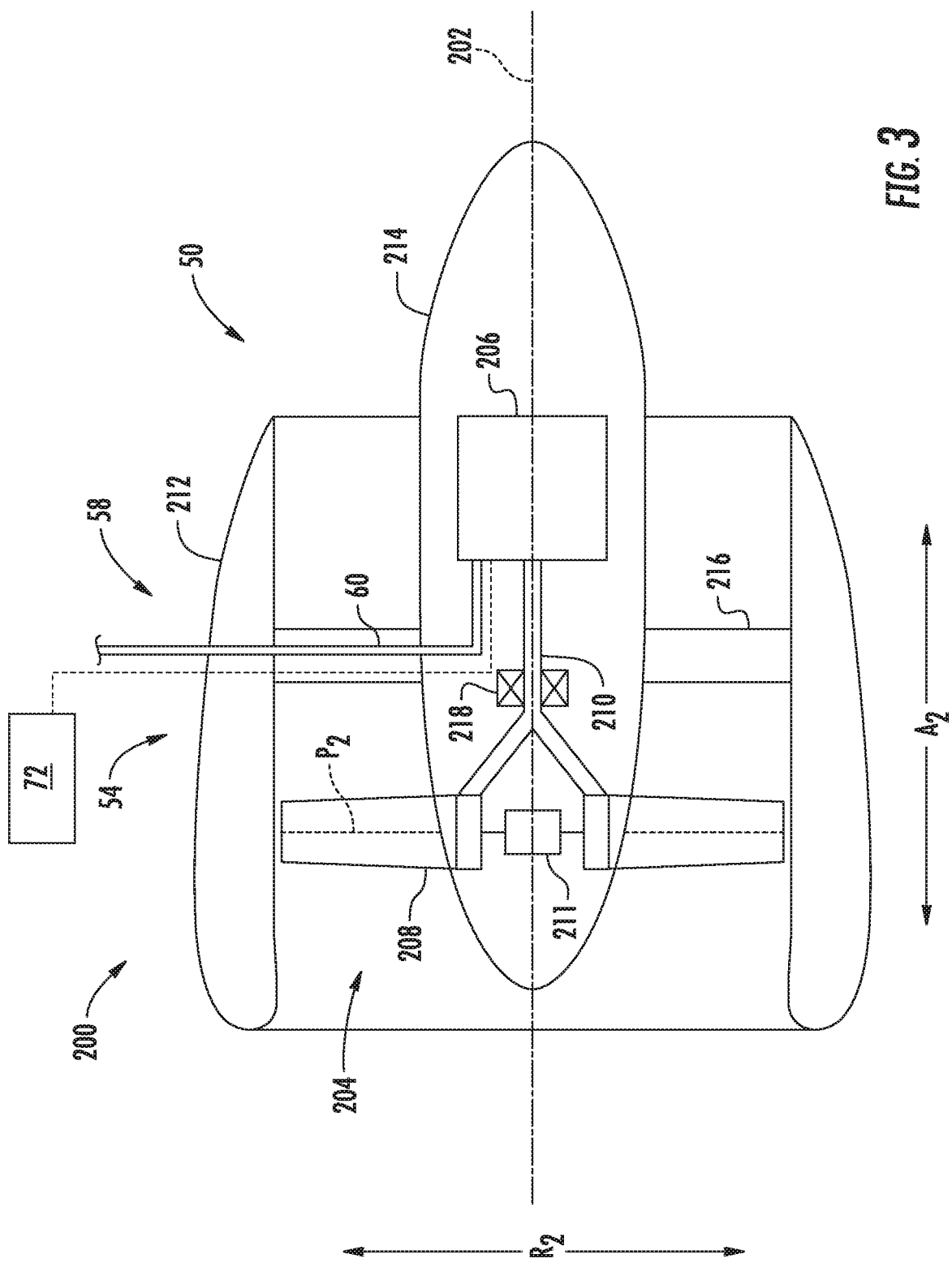
FIG. 3 is a schematic, cross-sectional view of an electric fan assembly in accordance with an exemplary embodiment of the present disclosure.

Referring now also to FIGS. 2 and 3, the exemplary aircraft 10 of FIG. 1 additionally includes a hybrid-electric propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. For the embodiment depicted, the first propulsor assembly 52 and second propulsor assembly 54 are each configured in an underwing-mounted configuration. However, as will be discussed below, one or both of the first and second propulsor assemblies 52, 54 may in other exemplary embodiments be mounted at any other suitable location.

Referring generally to FIGS. 1 through 3, the exemplary hybrid-electric propulsion system 50 generally includes the first propulsor assembly 52 having a combustion engine and a prime propulsor (which, for the embodiment of FIG. 2 are configured together as a turbofan engine 100), an electric machine (which for the embodiment depicted in FIG. 2 is an electric machine 56) drivingly coupled to the combustion engine, the second propulsor assembly 54 (which for the embodiment of FIG. 3 is configured as an electric propulsor assembly 200 electrically connectable to the electric machine), an energy storage unit 55, a controller 72, and a power bus 58. The electric propulsor assembly 200, the energy storage unit 55, and the electric machine are each electrically connectable through one or more electric lines 60 of the power bus 58. For example, the power bus 58 may include various switches or other power electronics movable to selectively electrically connect the various components of the hybrid electric propulsion system 50.

As will be described in greater detail below, the controller 72 is generally configured to distribute electrical power between the various components of the hybrid-electric propulsion system 50. For example, the controller 72 may be operable with the power bus 58 (including the one or more switches or other power electronics) to provide electrical power to, or draw electrical power from, the various components to operate the hybrid electric propulsion system 50 between, e.g., a charging mode and a discharging mode as will be described in greater detail below. Such is depicted schematically as the electric lines 60 of the power bus 58 extending through the controller 72.

The controller 72 may be a stand-alone controller, dedicated to the hybrid-electric propulsion system 50, or alternatively, may be incorporated into one or more of a main system controller for the aircraft 10, a separate controller for the exemplary turbofan engine 100 (such as a full authority digital engine control system for the turbofan engine 100, also referred to as a FADEC), etc.

Additionally, the energy storage unit 55 may generally be configured as an electrical energy storage unit for storing electrical energy. For example, the energy storage unit 55 may be configured as one or more batteries, such as one or more lithium-ion batteries, or alternatively may be configured as any other suitable electrical energy storage devices. It will be appreciated that for the hybrid-electric propulsion system 50 described herein, the energy storage unit 55 is configured to store a relatively large amount of electrical power. For example, in certain exemplary embodiments, the energy storage unit may be configured to store at least about fifty kilowatt hours of electrical power, such as at least about sixty-five kilowatt hours of electrical power, such as at least about seventy-five kilowatt hours of electrical power, and up to about five hundred kilowatt hours of electrical power.

Referring now particularly to FIGS. 1 and 2, the first propulsor assembly 52 includes a combustion engine mounted, or configured to be mounted, to the first wing 20 of the aircraft 10. More specifically, as depicted, for the embodiment of FIG. 2, the combustion engine is a turbomachine 102, and the first propulsor assembly 52 additionally includes a primary fan (referred to simply as "fan 104" with reference to FIG. 2). More specifically, for the embodiment depicted the turbomachine 102 and the fan 104 are configured together as part of a turbofan engine 100.

As shown in FIG. 2, the turbofan 100 defines an axial direction A1 (extending parallel to a longitudinal centerline 101 provided for reference) and a radial direction R1. As stated, the turbofan 100 includes the fan 104 and the turbomachine 102 disposed downstream from the fan 104.

The exemplary turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120.

The exemplary turbomachine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

Further, the exemplary fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the turbomachine 102. Accordingly, the exemplary turbofan 100 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

Referring still to FIG. 2, the hybrid-electric propulsion system 50 additionally includes an electric machine 56, which for the embodiment depicted is configured as an electric motor/generator. The electric machine 56 is, for the embodiment depicted, positioned within the turbomachine 102 of the turbofan engine 100 and is in mechanical communication with one of the shafts of the turbofan engine 100. More specifically, for the embodiment depicted, the electric machine is mechanically coupled to the second, LP turbine 118 through the LP shaft 124. The electric machine 56 is configured to convert mechanical power of the LP shaft 124 to electric power when operated as an electric generator, and further is configured to convert electrical power to mechanical power for the LP shaft 124 when operated as an electric motor. Accordingly, the electric machine 56 may be powered by the LP system (including the LP turbine 118) of the turbomachine 102 during certain operations, and further may power (or add power to) the LP system of the turbomachine 102 in other operations.

The electric machine 56 may be a relatively powerful electric machine. For example, in certain exemplary embodiments, the electric machine 56 may be configured to generate at least about seventy-five kilowatts of electrical power, or at least about one hundred horsepower of mechanical power. For example, in certain exemplary embodiments, the electric machine 56 may be configured to generate up to about one hundred and fifty kilowatts of electrical power and up to at least about two hundred horsepower of mechanical power, such as up to about one megawatt of electrical power and up to at least about one thousand three hundred horsepower of mechanical power.

It should be appreciated, however, that in other exemplary embodiments, the electric machine 56 may instead be positioned at any other suitable location within the turbomachine 102 or elsewhere, and may be, e.g., powered in any other suitable manner. For example, the electric machine 56 may be, in other embodiments, mounted coaxially with the LP shaft 124 within the turbine section, or alternatively may be offset from the LP shaft 124 and driven through a suitable gear train. Additionally, or alternatively, in other exemplary embodiments, the electric machine 56 may instead be powered by the HP system, i.e., by the HP turbine 116 through the HP shaft 122, or by both the LP system (e.g., the LP shaft 124) and the HP system (e.g., the HP shaft 122) via a dual drive system. Additionally, or alternatively, still, in other embodiments, the electric machine 56 may include a plurality of electric machines, e.g., with one being drivingly connected to the LP system (e.g., the LP shaft 124) and one being drivingly connected to the HP system (e.g., the HP shaft 122). Further, although described as an electric machine, in other embodiments, the electric machine 56 may instead be configured simply as an electric generator.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated that in other exemplary embodiments, the first propulsor assembly 52 may include any other suitable type of engine. For example, in other embodiments, the turbofan engine 100 may instead be configured as a turboprop engine or an unducted turbofan engine. Additionally, however, in other embodiments, the turbofan engine 100 may instead be configured as any other suitable combustion engine for driving the electric machine 56. For example, in other embodiments, the turbofan engine may be configured as a turboshaft engine, or any other suitable combustion engine.

Referring still to FIGS. 1 and 2, the turbofan engine 100 further includes a controller 150, and although not depicted, one or more sensors. The controller 150 may be a full authority digital engine control system, also referred to as a FADEC. The controller 150 of the turbofan engine 100 may be configured to control operation of, e.g., the actuation member 132, a fuel delivery system to the combustion section 114 (not shown), etc. Additionally, the controller 150 may be operably connected to the one or more sensors to receive data from the sensors and determine various operational parameters of the turbofan engine 100. For example, the controller 150 may determine one or more of an exhaust gas temperature, a rotational core speed, a compressor discharge temperature, etc. Further, referring back also to FIG. 1, the controller 150 of the turbofan engine 100 is operably connected to the controller 72 of the hybrid-electric propulsion system 50. Moreover, as will be appreciated, the controller 72 may further be operably connected to one or more of the first propulsor assembly 52 (including controller 150), the electric machine 56, the second propulsor assembly 54, and the energy storage unit 55 through a suitable wired or wireless communication system (depicted in phantom).

Referring now particularly to FIGS. 1 and 3, as previously stated the exemplary hybrid-electric propulsion system 50 additionally includes the second propulsor assembly 54 mounted, for the embodiment depicted, to the second wing 22 of the aircraft 10. Referring particularly to FIG. 3, the second propulsor assembly 54 is generally configured as an electric propulsor assembly 200 including an electric motor 206 and a propulsor/fan 204. The electric propulsor assembly 200 defines an axial direction A2 extending along a longitudinal centerline axis 202 that extends therethrough for reference, as well as a radial direction R2. For the embodiment depicted, the fan 204 is rotatable about the centerline axis 202 by the electric motor 206.

The fan 204 includes a plurality of fan blades 208 and a fan shaft 210. The plurality of fan blades 208 are attached to/rotatable with the fan shaft 210 and spaced generally along a circumferential direction of the electric propulsor assembly 200 (not shown). In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and for the embodiment depicted are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the electric propulsor assembly 200 depicted additionally includes a fan casing or outer nacelle 212, attached to a core 214 of the electric propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the electric propulsor assembly 200 may be referred to as a ducted electric fan.

Referring still particularly to FIG. 3, the fan shaft 210 is mechanically coupled to the electric motor 206 within the core 214, such that the electric motor 206 drives the fan 204 through the fan shaft 210. The fan shaft 210 is supported by one or more bearings 218, such as one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor), or alternatively, still, may be an axial flux electric motor (i.e., with the rotor neither outside the stator nor inside the stator, but rather offset from it along the axis of the electric motor).

As briefly noted above, the electric power source (e.g., the electric machine 56 or the energy storage unit 55) is electrically connected with the electric propulsor assembly 200 (i.e., the electric motor 206) for providing electrical power to the electric propulsor assembly 200. More particularly, the electric motor 206 is in electrical communication with the electric machine 56 through the electrical power bus 58, and more particularly through the one or more electrical cables or lines 60 extending therebetween.

It should be appreciated, however, that in other exemplary embodiments the exemplary hybrid-electric propulsion system 50 may have any other suitable configuration, and further, may be integrated into an aircraft 10 in any other suitable manner. For example, in other exemplary embodiments, the electric propulsor assembly 200 of the hybrid electric propulsion system 50 may instead be configured as a plurality of electric propulsor assemblies 200 and/or the hybrid electric propulsion system 50 may further include a plurality of combustion engines (such as turbomachines 102) and electric machines 56. Further, in other exemplary embodiments, the electric propulsor assembly(ies) 200 and/or combustion engine(s) and electric machine(s) 56 may be mounted to the aircraft 10 at any other suitable location in any other suitable manner (including, e.g., tail mounted configurations).

Figure 4:
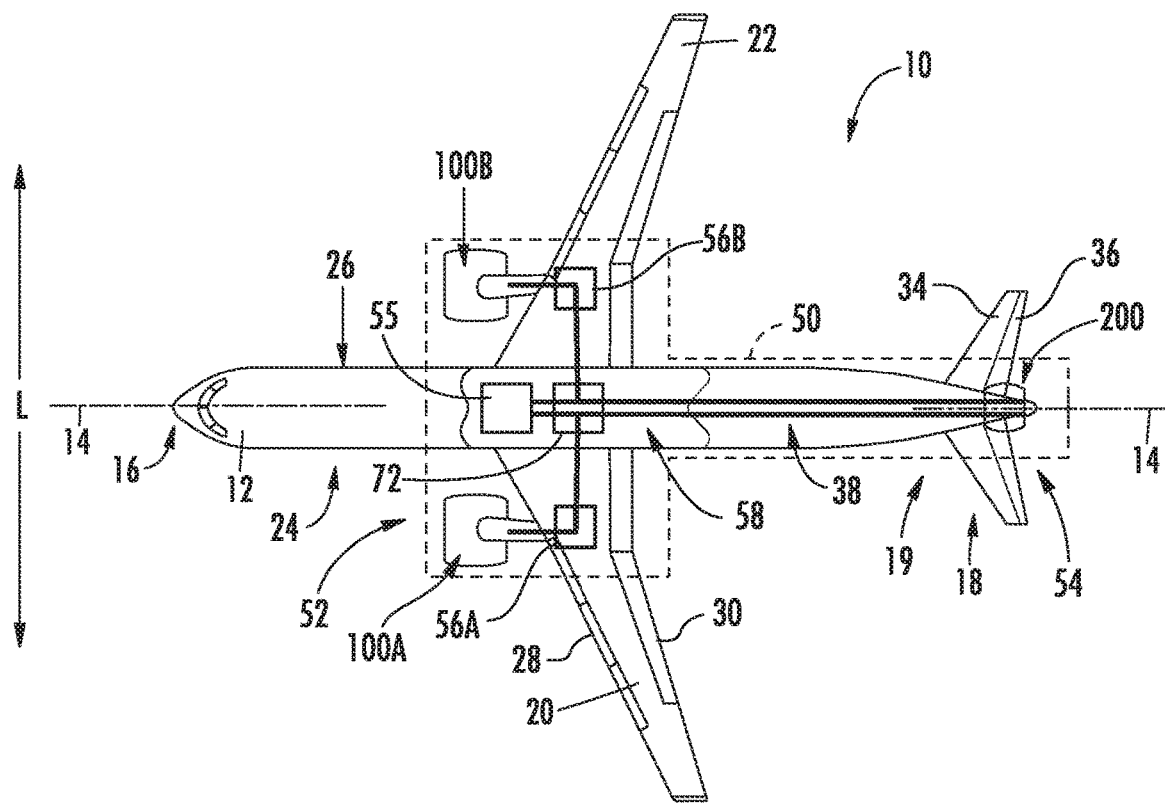
FIG. 4 is a top view of an aircraft including a hybrid-electric propulsion system in accordance with another exemplary embodiment of the present disclosure.
Figure 5:
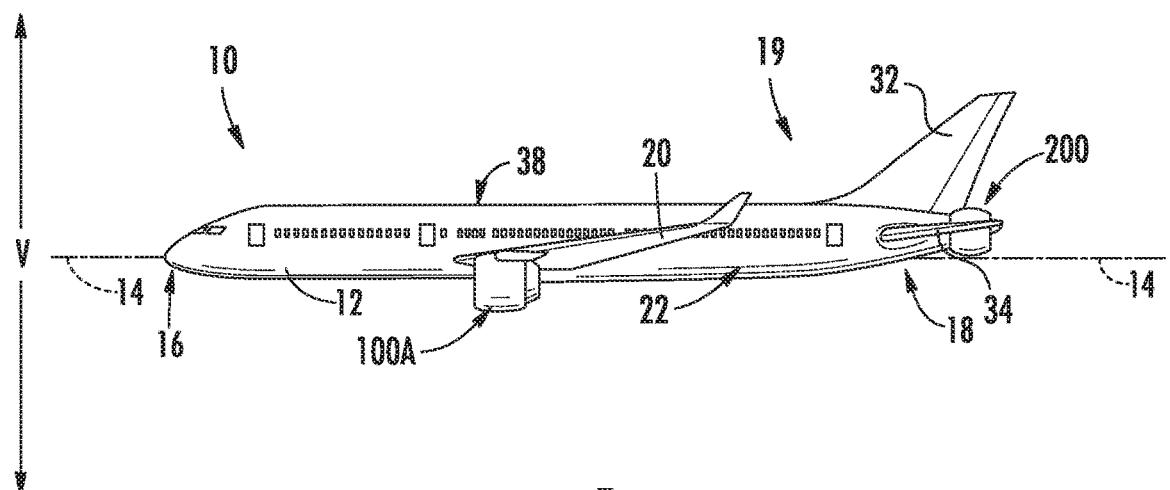
FIG. 5 is a port side view of the exemplary aircraft of FIG. 4.

For example, referring now to FIGS. 4 and 5, an aircraft 10 and hybrid-electric propulsion system 50 in accordance with still another exemplary embodiment of the present disclosure is depicted. The exemplary aircraft 10 and hybrid-electric propulsion system 50 of FIGS. 4 and 5 may be configured in substantially the same manner as exemplary aircraft 10 and hybrid-electric propulsion system 50 of FIGS. 1 through 3, and accordingly, the same or similar numbers may refer to same or similar parts.

For example, the exemplary aircraft 10 of FIGS. 4 and 5 generally includes a fuselage 12, an empennage 19, an energy storage unit 55, a first wing 20, and a second wing 22. Additionally, the hybrid-electric propulsion system 50 includes a first propulsor assembly 52 and one or more electric machines (i.e., generators 56A, 56B, discussed below) mechanically driven by the first propulsor assembly 52. Moreover, the hybrid-electric propulsion system 50 includes a second propulsor assembly 54, which is an electric propulsor assembly 200.

However, for the embodiment of FIGS. 4 and 5, the first propulsor assembly 52 includes a first aircraft engine and a second aircraft engine, configured as first turbofan engine 100A and a second turbofan engine 100B, respectively. For example, turbofan engines 100A, 100B may be configured as turbofan engines (see, e.g., FIG. 2), or any other suitable type of combustion engine, attached to and suspended beneath the wings 20, 22 in an under-wing configuration. Additionally, for the embodiment of FIGS. 4 and 5, the hybrid-electric propulsion system 50 further includes one or more electric machines operable with each of the turbofan engines 100A, 100B. More specifically, for the embodiment depicted, the hybrid-electric propulsion system 50 further includes a first electric machine 56A operable with the first turbofan engine 100A and a second electric machine 56B operable with the second turbofan engine 100B. Although depicted schematically outside the respective turbofan engines 100A, 100B, in certain embodiments, the electric machines 56A, 56B may be positioned within a respective turbofan engines 100A, 100B (see, e.g., FIG. 2).

Further, for the embodiment of FIGS. 4 and 5, the electric propulsion assembly includes an electric propulsor assembly 200 configured to be mounted at the aft end 18 of the aircraft 10 to at least one of the empennage 19 of the aircraft 10 or the fuselage 12 of the aircraft, and hence the electric propulsor assembly 200 depicted may be referred to as an "aft engine." More specifically, the exemplary electric propulsor assembly 200 depicted is mounted to the fuselage 12 of the aircraft 10 at the aft end 18 of the aircraft 10 and configured to ingest and consume air forming a boundary layer over the fuselage 12 of the aircraft 10. Accordingly, the exemplary electric propulsor assembly 200 depicted in FIGS. 4 and 5 may also be referred to as a boundary layer ingestion (BLI) fan. The electric propulsor assembly 200 is mounted to the aircraft 10 at a location aft of the wings 20, 22 and/or the turbofan engines 100A, 100B. Specifically, for the embodiment depicted, the electric propulsor assembly 200 is fixedly connected to the fuselage 12 at the aft end 18, such that the electric propulsor assembly 200 is incorporated into or blended with a tail section at the aft end 18.

Further, for the embodiment of FIGS. 4 and 5 the hybrid electric propulsion assembly further includes a controller 72. As will be appreciated, the energy storage unit 55 may be configured, in certain operating conditions, to receive electrical power from one or both of the first electric machine 56A and the second electric machine 56B. Further, in certain operating conditions, the energy storage unit 55 may be configured to provide stored electrical power to the electric propulsor assembly 200. Moreover, the controller 72 is operably connected to turbofan engines 100A, 100B, electric machines 56A, 56B, electric propulsor assembly 200, energy storage unit 55, and power bus 58, such that the controller 72 may, e.g., direct electrical power between the various components of the hybrid electric propulsion system 50.

It should be appreciated, however, that in still other exemplary embodiments of the present disclosure, any other suitable aircraft 10 may be provided having a hybrid-electric propulsion system 50 configured in any other suitable manner. For example, in other embodiments, the electric propulsor assembly 200 may be incorporated into the fuselage of the aircraft 10, and thus configured as a "podded engine," or pod-installation engine. Further, in still other embodiments, the electric propulsor assembly 200 may be incorporated into a wing of the aircraft 10, and thus may be configured as a "blended wing engine."

Figure 6:
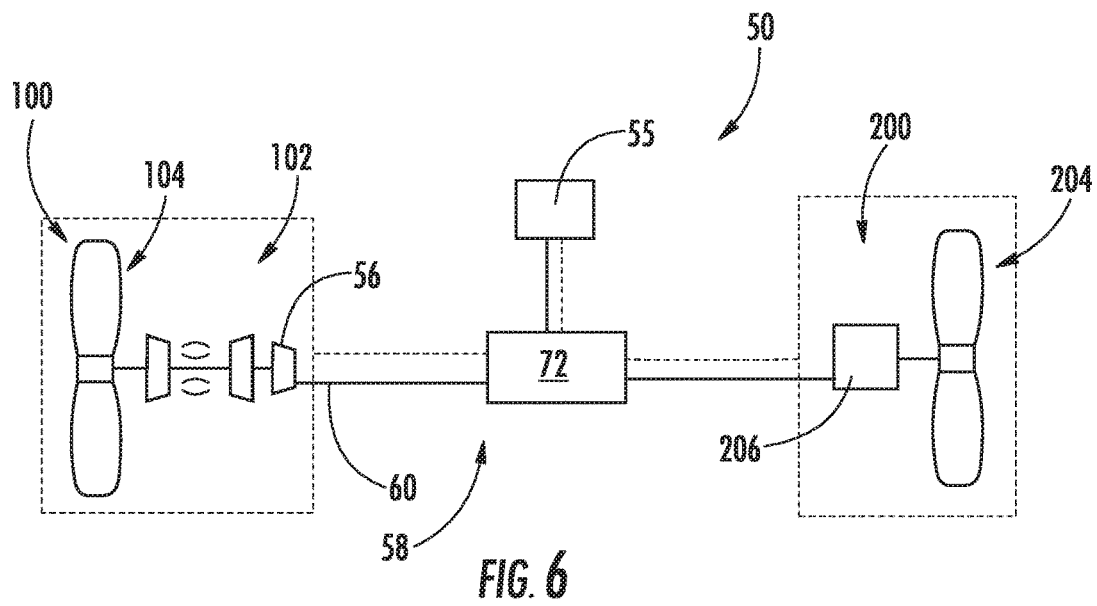
FIG. 6 is a schematic view of a hybrid-electric propulsion system in accordance with another exemplary embodiment of the present disclosure.

Referring now to FIG. 6, providing a schematic diagram of a hybrid-electric propulsion system 50 in accordance with an exemplary embodiment of the present disclosure, certain aspects of the present disclosure will be described. More specifically, FIG. 6 provides a schematic diagram of the exemplary hybrid electric propulsion system 50 described above with reference to FIGS. 1 through 3. Accordingly, the exemplary hybrid-electric propulsion system 50 of FIG. 6 generally includes a combustion engine, a prime propulsor 104, an electric machine 56, an energy storage unit 55, a controller 72, a power bus 58, and an electric propulsor assembly 200, the electric propulsor assembly 200 generally including an electric motor 206 drivingly connected to a propulsor or fan 204. The combustion engine is configured as a turbomachine 102 and is mechanically coupled to the prime propulsor 104 for driving the prime propulsor 104 and generating thrust (the turbomachine 102 and prime propulsor 104 together configured as a turbofan engine 100). Additionally, the turbomachine 102 is mechanically coupled to the electric machine 56 to generate electrical power. The power bus 58 generally electrically connects the electric machine 56, the energy storage unit 55, and the electric motor 206 of the electric propulsor assembly 200. More specifically, for the exemplary embodiment depicted, the power bus 58 electrically connects the electric machine 56, the energy storage unit 55, and the electric motor 206 all through the controller 72. Notably, although for the embodiment depicted electric lines 60 of the power bus 58 extend physically through the controller 72, it should be appreciated that in other exemplary embodiments, the controller 72 may instead be operably connected to, e.g., one or more switches or other hardware for directing electrical power between the electric machine 56, the energy storage unit 55, and the electric motor 206. Further, it should be appreciated that although not depicted, the hybrid electric propulsion system 50 may further include one or more rectifiers, inverters, converters, or other power electronics for conditioning or converting the electrical power within and throughout the hybrid electric propulsion system 50.

Moreover, the exemplary hybrid-electric propulsion system 50 is operable in a variety of different modes. For example, the exemplary hybrid-electric propulsion system 50 may generally be operable in an electric charge mode, in which at least a portion of the electric power generated by the electric machine 56 is transferred through the power bus 58 to the energy storage unit 55 to charge the energy storage unit 55. When in the electric charge mode, at least a portion of the electric power generated by the electric machine 56 may further be transferred through the power bus 58 to the electric motor 206 of the electric propulsor assembly 200. A ratio of an amount of the electric power transferred to the energy storage unit 55 to an amount of the electric power transferred to the electric motor 206 may be a fixed ratio, or alternatively, may vary based on one or more operating parameters of the hybrid electric propulsor assembly 200. For example, in certain exemplary embodiments, the ratio may be between about 1:10 and about 10:1, such as between about 1:5 and about 5:1.

Additionally, the exemplary hybrid-electric propulsion system 50 may further be operable in an electric discharge mode, in which electrical power stored within the energy storage unit 55 is transferred through the power bus 58 to the electric motor 206 of the electric propulsor assembly 200. When in the electric discharge mode, the electric motor 206 of the electric propulsor assembly 200 may receive electrical power solely from the energy storage unit 55, or may receive a combination of electrical power from the energy storage unit 55 as well as from the electric machine 56. The energy storage unit 55 may receive no electrical power from the electric machine 56 during the electric discharge mode. Additionally, or alternatively, in other exemplary embodiments, the energy storage unit 55 may further provide electrical power to the electric machine 56 to drive one or more components of the turbomachine 102 in the electric discharge mode.

Furthermore, exemplary hybrid-electric propulsion system 50 may additionally be operable in a maintain mode. When in the maintain mode, electrical power is neither transferred to or from the energy storage unit 55, and instead any charge within the energy storage unit 55 is maintained. When operating in the maintain mode, substantially all of the electric power generated by the electric machine 56 (if any) may be transferred directly to the electric motor 206 of the electric propulsor assembly 200.

Figure 7:
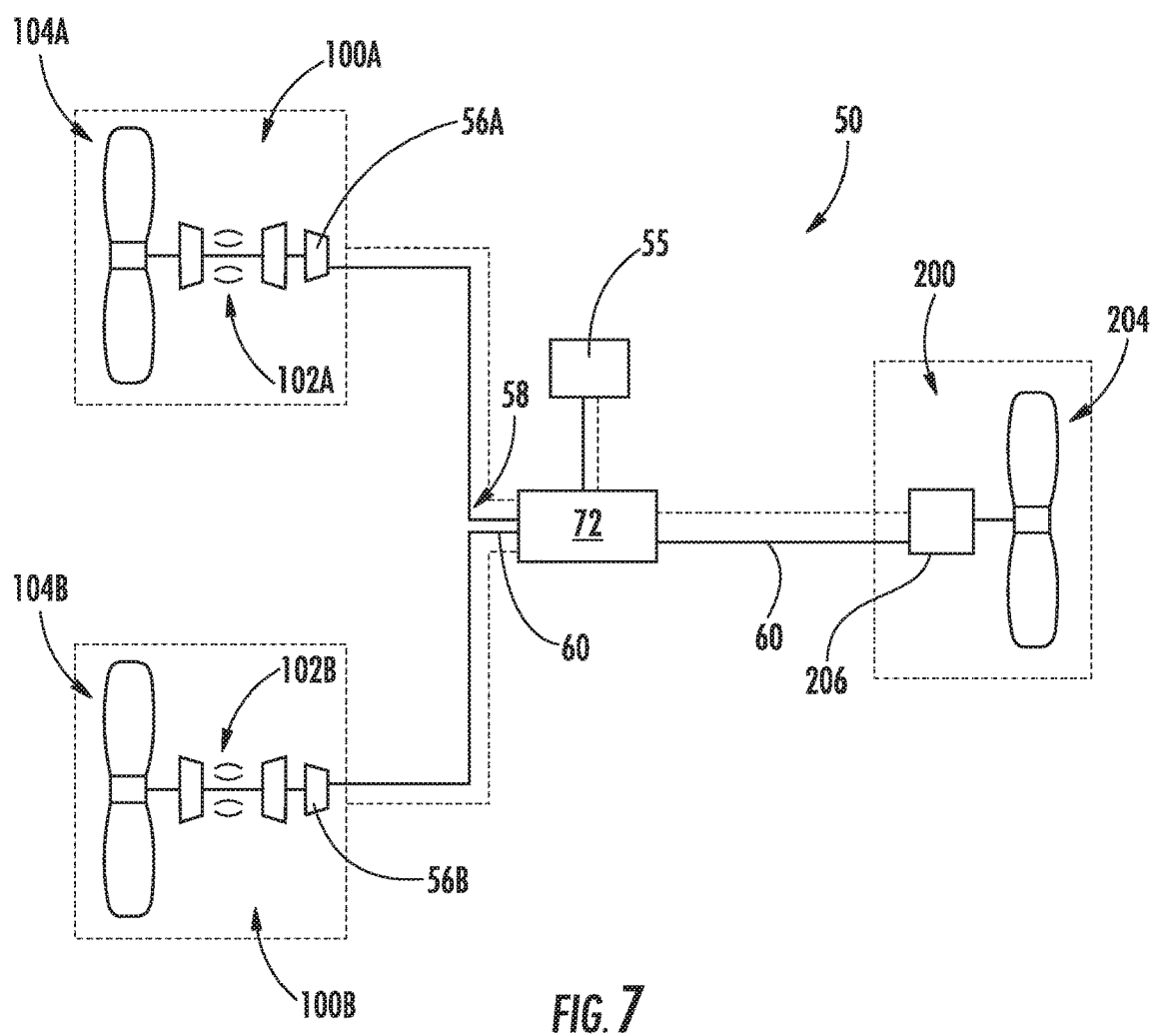
FIG. 7 is a schematic view of a hybrid-electric propulsion system in accordance with yet another exemplary embodiment of the present disclosure.

As is discussed above, it should be appreciated that in other exemplary embodiments, the hybrid-electric propulsion system 50 may be configured in any other suitable manner. For example, referring now also to FIG. 7, the exemplary hybrid electric propulsion system 50 of FIGS. 4 and 5 is depicted schematically. As is discussed above, the hybrid electric propulsion system 50 of FIGS. 4 and 5, depicted schematically in FIG. 7, is configured in a similar manner as the hybrid electric propulsion system 50 of FIGS. 1 through 3, depicted schematically in FIG. 6. For example, the exemplary hybrid-electric propulsion system 50 generally includes a combustion engine (i.e., turbomachine 102 for the embodiment depicted), a prime propulsor 104, an electric machine 56, an energy storage unit 55, a controller 72, a power bus 58, and an electric propulsor assembly 200, with the electric propulsor assembly 200 generally including an electric motor 206 drivingly connected to a propulsor 204.

However, for the embodiment of FIG. 7, the turbomachine 102 is instead configured as a plurality of turbomachines 102, and the electric machine 56 is instead configured as a plurality of electric machines 56. More specifically, for the embodiment of FIG. 7, the turbomachine 102 is configured as a first turbomachine 102A and a second turbomachine 102B, and the electric machine 56 is configured as a first electric machine 56A and a second electric machine 56B. The first turbomachine 102A is coupled to and mechanically drives the first electric machine 56A such that the first electric machine 56A may generate electrical power, and the second turbomachine 102B is coupled to and mechanically drives the second electric machine 56B such that the second electric machine 56B may generate electrical power. Each of the first and second electric machines 56A, 56B are electrically coupled to the power bus 58.

More specifically, for such an exemplary embodiment, the power bus 58 accordingly electrically connects the first electric machine 56A, the second electric machine 56B, the energy storage unit 55, and the electric motor 206 of the electric propulsor assembly 200 all through the controller 72. Further, the exemplary hybrid-electric propulsion system 50 of the exemplary embodiment of FIG. 7 may also be operable between an electric charge mode, a maintain mode, and an electric discharge mode. In the electric charge mode at least a portion of the electric power generated by one or both of the first electric machine 56A and second electric machine 56B is transferred through the power bus 58 to the energy storage unit 55 to charge the energy storage unit 55. For example, in certain exemplary embodiments, substantially all of the electrical power generated by one or both of the first electric machine 56A and second electric machine 56B may be transferred to the energy storage unit 55 for charging the energy storage unit 55. For example, in one exemplary aspect, substantially all of the electric power generated by the first electric machine 56A may be transferred to the energy storage unit 55 for charging the energy storage unit 55, while substantially all the electrical power from the second electric machine 56B may be transferred to the electric motor 206 for driving the electric motor 206. Alternatively, in other exemplary embodiments, a portion of the electrical power generated by one or both of the first electric machine 56A and second electric machine 56B may be transferred to the energy storage unit 55 for charging energy storage unit 55.

By contrast, when operating in the maintain mode, electrical power is transferred neither to nor from the energy storage unit 55, and instead any charge within the energy storage unit 55 is maintained. Further, when in the electric discharge mode, electrical power stored within the energy storage unit 55 may be transferred through the power bus 58 to the electric motor 206 of the electric propulsor assembly 200. When in the electric discharge mode, the electric motor 206 of the electric propulsor assembly 200 may receive electrical power solely from the energy storage unit 55, or may receive a combination of electrical power from the energy storage unit 55 as well as from one or both of the first electric machine 56A and second electric machine 56B.

Additionally, or alternatively, in certain exemplary embodiments, one or both of the first electric machine 56A and second electric machine 56B may receive electrical power from the energy storage unit 55 during operation of the hybrid electric propulsion system in the electric discharge mode. Further, in certain exemplary embodiments, one of the first turbomachine 102A or second turbomachine 102B may be operated in a "low-power" mode, while the other is operated in a "high-power" mode during operation of the hybrid electric propulsion system in the electric discharge mode. The electric machine 56 coupled to the turbomachine 102 operated in the low-power mode may receive electrical power to drive one or more components of such turbomachine 102 (e.g., drive, or assist with driving, a prime propulsor), while the electric machine 56 coupled to the turbomachine 102 operated in the high power mode may generate electrical power, and provide at least a portion of such electrical power to one or more of the energy storage unit 55, the electric propulsor assembly 200, and/or the other electric motor 56 coupled to the turbomachine 102 operated the low-power mode.

Figure 8:
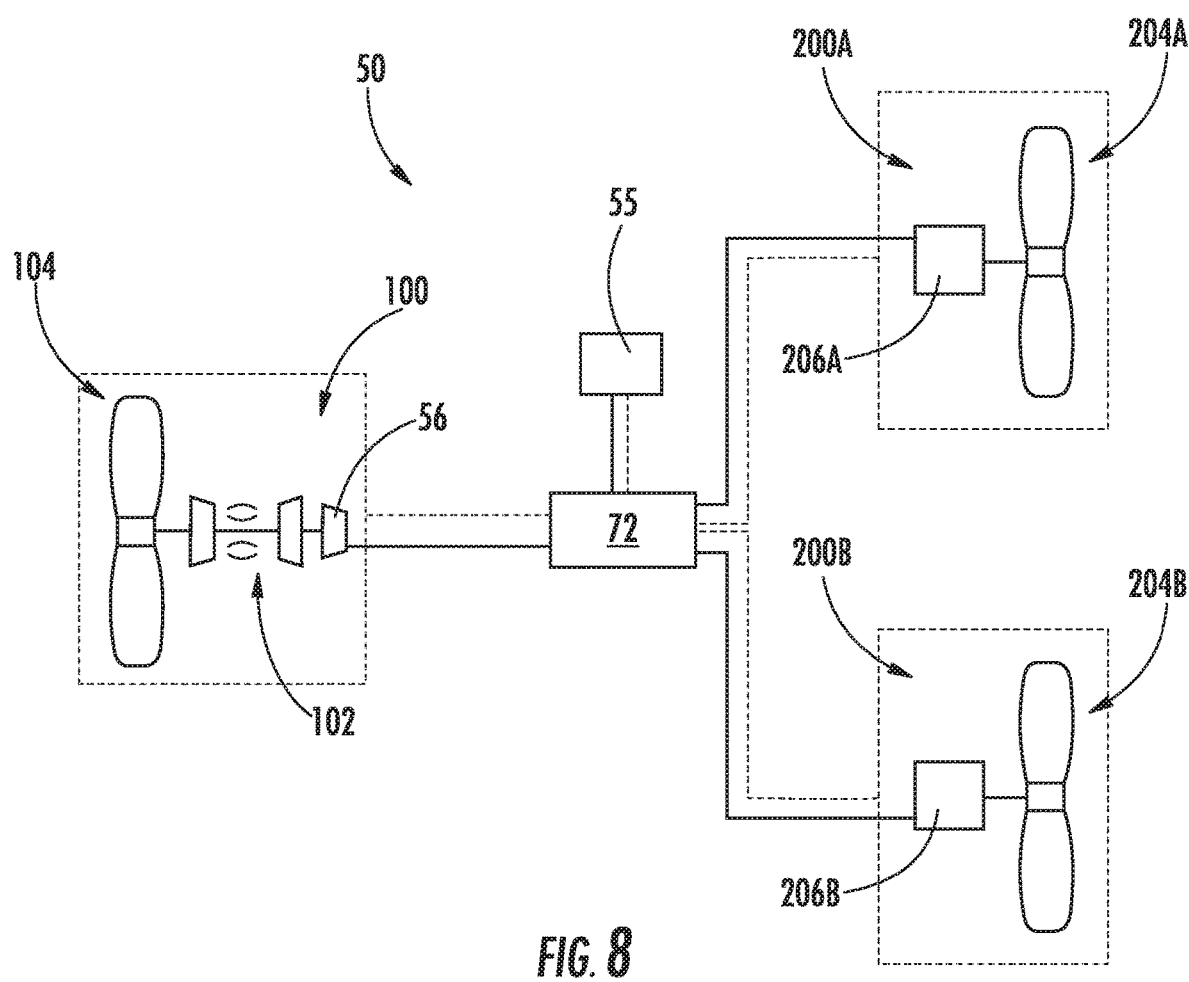
FIG. 8 is a schematic view of a hybrid-electric propulsion system in accordance with still another exemplary embodiment of the present disclosure.

Further, referring now to FIG. 8, a schematic diagram of a hybrid electric propulsion system 50 in accordance with yet another exemplary embodiment of the present disclosure is provided. The exemplary hybrid electric propulsion system 50 of FIG. 8 is configured in substantially the same manner as exemplary hybrid electric propulsion system 50 of FIG. 6. However, for the embodiment of FIG. 8, the electric propulsor assembly 200 is instead configured as a plurality of electric propulsor assemblies 200, with each of the plurality of electric propulsor assemblies 200 including an electric motor 206 drivingly connected to a respective propulsor 204. More specifically, for the embodiment of FIG. 8, the electric propulsor assembly 200 is configured as a first electric propulsor assembly 200A and a second electric propulsor assembly 200B. The first electric propulsor assembly 200A includes a first electric motor 206A drivingly connected to a first propulsor 204A, and similarly, the second electric propulsor assembly 200B includes a second electric motor 206B drivingly connected to a second propulsor 204B.

Further, for such an exemplary embodiment, the power bus 58 electrically connects the electric machine 56, the energy storage unit 55, the first electric motor 206A of the first electric propulsor assembly 200A, and the second electric motor 206B of the second electric propulsor assembly 200B. More specifically, for the exemplary embodiment depicted, the power bus 58 electrically connects the electric machine 56, the energy storage unit 55, and the first and second electric motors 206A, 206B all through the controller 72. Further, the exemplary hybrid-electric propulsion system 50 of the exemplary embodiment of FIG. 8 is also operable between an electric charge mode, a maintain mode, and an electric discharge mode. In the electric charge mode at least a portion of the electric power generated by the electric machine 56 is transferred through the power bus 58 to the energy storage unit 55 to charge the energy storage unit 55. In addition, during certain exemplary aspects, at least a portion of the electric power may optionally also be transferred to one or both of the first electric motor 206 and second electric motor 206. When in the maintain mode, electrical power is neither transferred to or from the energy storage unit 55, and instead any charge within the energy storage unit 55 is maintained.

By contrast, when in the electric discharge mode electrical power stored within the energy storage unit 55 may be transferred through the power bus 58 to one or both of the first electric motor 206A and the second electric motor 206B. For example, in certain exemplary embodiments, one of the first electric motor 206A or second electric motor 206B may receive electrical power from the energy storage unit 55, and the other of the first electric motor 206A or second electric motor 206B may receive electrical power directly from the electric machine 56. Alternatively, both the first electric motor 206A and the second electric motor 206B may receive electrical power solely from the energy storage unit 55, or may each receive electrical power from both the energy storage unit 55 and the electric machine 56. Alternatively, still, in other exemplary embodiments, the electric machine 56 may receive electrical power from the energy storage unit 55 during operation of the hybrid electric propulsion system in the electric discharge mode to drive one or more components of the turbomachine 102.

It should further be appreciated that in still other exemplary embodiments, any other suitable hybrid-electric propulsion system 50 may be provided.

Figure 9:
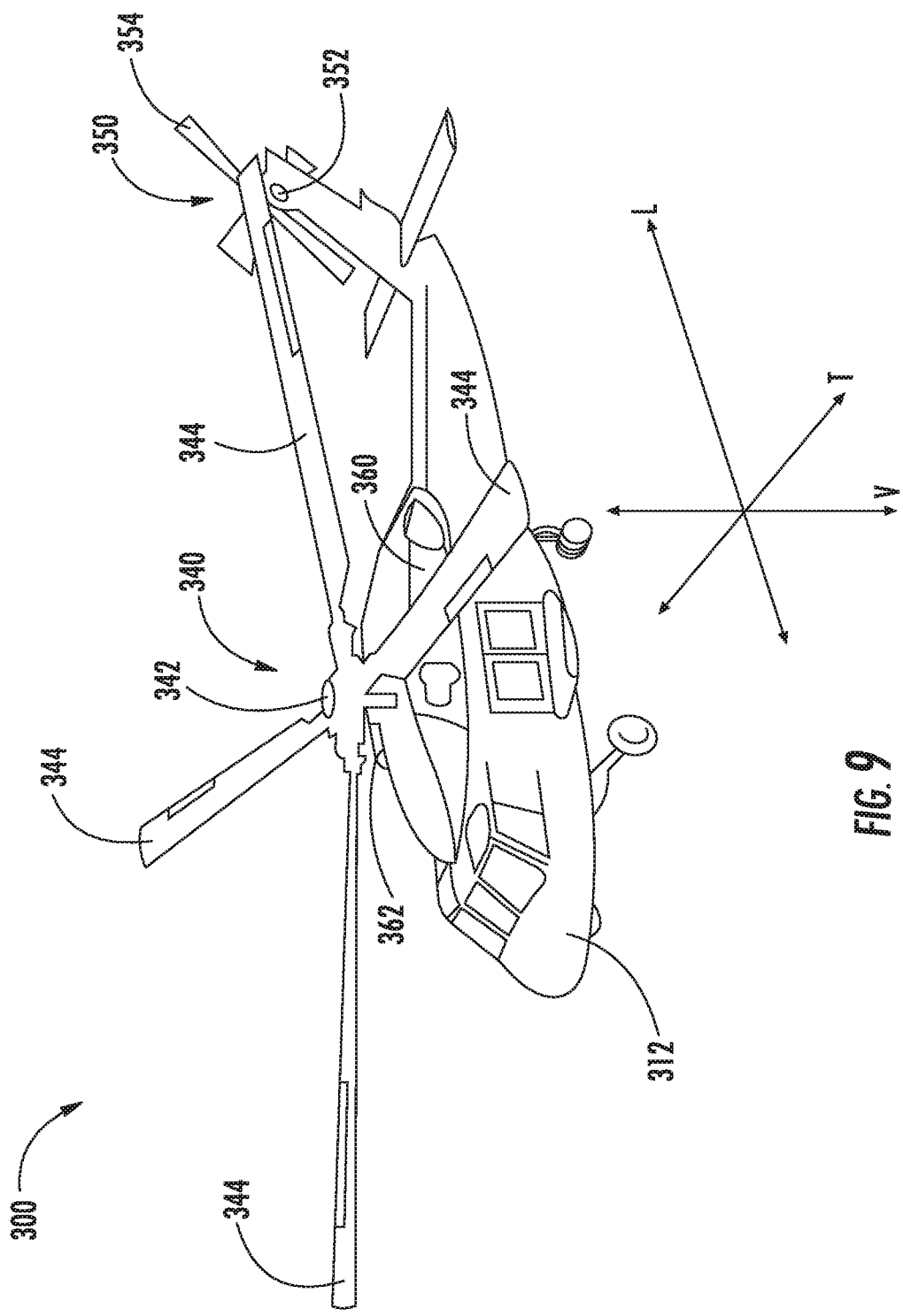
FIG. 9 is a perspective view of an aircraft according to another exemplary embodiment of the present disclosure.
Figure 10:
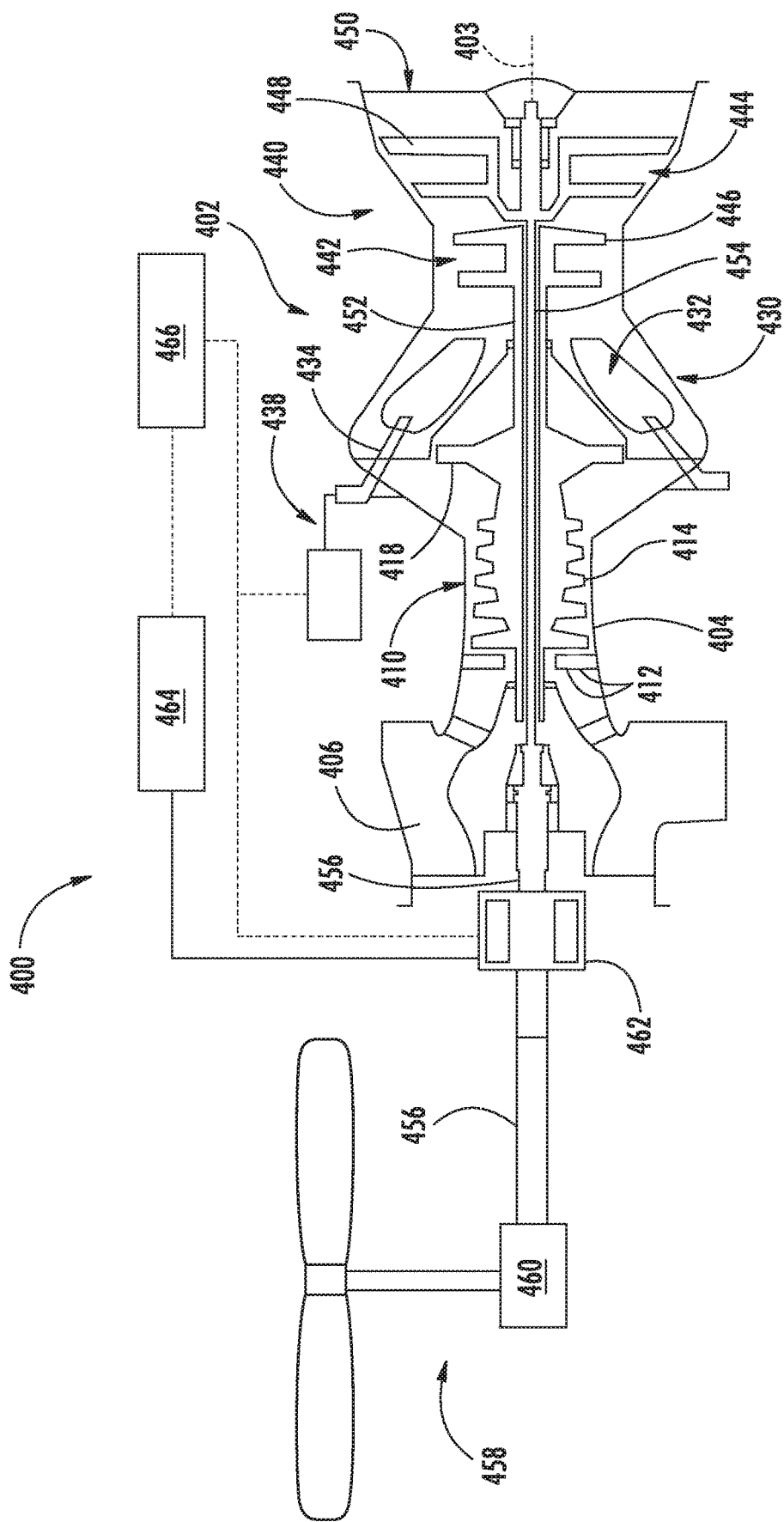
FIG. 10 is a schematic view of a hybrid electric propulsion system in accordance with another exemplary embodiment of the present disclosure.

For example, referring now to FIGS. 9 and 10, an aircraft and a hybrid electric propulsion system in accordance with another exemplary embodiment are provided. More particularly, referring first to FIG. 9, a perspective view is provided of an exemplary aircraft 300 in accordance with still another exemplary embodiment of the present disclosure. The aircraft 300 generally defines a transverse direction T, a longitudinal direction L, and a vertical direction V. In operation, the aircraft 300 may move along or around the transverse direction T, the longitudinal direction L, and/or the vertical direction V.

In the embodiment illustrated in FIG. 9, the aircraft 300 includes an airframe 312 defining a cockpit 320. The aircraft 300 further includes a main rotor assembly 340 and a tail rotor assembly 350. The main rotor assembly 340 includes a main rotor hub 342 and a plurality of main rotor blades 344. As shown, each main rotor blade 344 extends outwardly from the main rotor hub 342. The tail rotor section 350 includes a tail rotor hub 352 and a plurality of tail rotor blades 354. Each tail rotor blade 354 extends outwardly from the tail rotor hub 352.

Additionally, the aircraft 300 includes a hybrid electric propulsion assembly (not labeled), as will be described in greater detail below. The hybrid electric propulsion assembly generally includes a first gas turbine engine 360 and a second gas turbine engine 362. It should be appreciated, that in at least certain exemplary embodiments, one or both of the first and second gas turbine engines 360, 362 of the aircraft 300 in FIG. 9 may be configured in substantially the same manner as the gas turbine engine 402 depicted in FIG. 10, described below, and further that the hybrid electric propulsion system may further include one or more of the additional components from the exemplary hybrid electric propulsion system depicted in FIG. 10.

Referring still to FIG. 9, the first and second gas turbine engines 360, 362 may be mechanically coupled to one another such that the first and second gas turbine engines 360, 362 operate together. For example, the first and second gas turbine engines 360, 362 may be ganged together in a gearbox by, e.g., differentials and one-way clutches (such as sprag clutches), such that they operate together.

Further, the first and second gas turbine engines 360, 362 may generally generate and transmit power to drive rotation of the main rotor blades 344 and the tail rotor blades 354. In particular, rotation of the main rotor blades 344 generates lift for the aircraft 300 (or vertical thrust) will, while rotation of the tail rotor blades 354 generates sideward thrust at the tail rotor section 350 and counteracts torque exerted on the airframe 312 by the main rotor blades 344. Rotation of the tail rotor blades 354 may also pivot the aircraft 300 about the vertical direction V.

Referring now to FIG. 10 a schematic view is provided of a hybrid electric propulsion system 400 for an aircraft in accordance with an exemplary embodiment of the present disclosure. The exemplary hybrid electric propulsion system 400 may be incorporated into an aircraft similar to the exemplary aircraft 300 described above with reference to FIG. 9. However, in other exemplary embodiments, the hybrid electric propulsion system 400 may instead be utilized with any other suitable aircraft, as described below.

For the embodiment depicted, the hybrid electric propulsion system 400 generally includes a gas turbine engine 402, a prime propulsor mechanically coupled to the gas turbine engine 402, an electric machine 462 also mechanically coupled to the gas turbine engine 402, an energy storage unit 464, and a controller 466. Functionality of each of these components is as follows.

With reference first to the gas turbine engine 402, a cross-sectional view is provided. As is depicted, the gas turbine engine 402 defines a longitudinal or centerline axis 403 extending therethrough for reference. The gas turbine engine 402 generally includes a substantially tubular outer casing 404 that defines an annular inlet 406. The outer casing 404 encloses, in serial flow relationship, a gas generator compressor 410 (or high pressure compressor), a combustion section 430, a turbine section 440, and an exhaust section 450. The exemplary gas generator compressor 410 depicted includes an annular array of inlet guide vanes 412, one or more sequential stages of compressor blades 414, and a stage of centrifugal rotor blades 418. Although not depicted, the gas generator compressor 410 may also include a plurality of fixed or variable stator vanes.

The combustion section 430 generally includes a combustion chamber 432, one or more fuel nozzles 434 extending into the combustion chamber 432, and a fuel delivery system 438. The fuel delivery system 438 is configured to provide fuel to the one or more fuel nozzles 434, which, in turn, supply fuel to mix with compressed air from the gas generator compressor 410 entering the combustion chamber 432. Further, the mixture of fuel and compressed air is ignited within the combustion chamber 432 to form combustion gases. As will be described below in more detail, the combustion gases drive both the gas generator compressor 410 and the turbines within the turbine section 440.

More specifically, the turbine section 440 includes a gas generator turbine 442 (or high pressure turbine) and a power turbine 444 (or low pressure turbine). The gas generator turbine 442 includes one or more sequential stages of turbine rotor blades 446, and may further include one or more sequential stages of stator vanes (not shown). Likewise, the power turbine 444 includes one or more sequential stages of turbine rotor blades 448, and may further include one or more sequential stages of stator vanes (also not shown). Additionally, the gas generator turbine 442 is drivingly connected to the gas generator compressor 410 via a gas generator shaft 452, and the power turbine 444 is drivingly connected to an output shaft 456 via a power turbine shaft 454.

In operation, the combustion gases drive both the gas generator turbine 442 and the power turbine 444. As the gas generator turbine 442 rotates around the centerline axis 403, the gas generator compressor 410 and the gas generator shaft 452 both also rotate around the centerline axis 403. Further, as the power turbine 444 rotates, the power turbine shaft 454 rotates and transfers rotational energy to the output shaft 456. Accordingly, it will be appreciated that the gas generator turbine 442 drives the gas generator compressor 410 and the power turbine 444 drives the output shaft 456.

It should be appreciated, however, that in other exemplary embodiments, the gas turbine engine 402 of FIG. 10 may instead have any other suitable configuration. For example, in other exemplary embodiments, the combustion section 430 may include a reverse flow combustor, the gas turbine engine may include any suitable number of compressors, spools, and turbines, etc.

Referring still to FIG. 10, the output shaft 456 is configured to rotate the prime propulsor of the hybrid electric propulsion system 400, which for the exemplary embodiment depicted is a main rotor assembly 458 (which may be configured in substantially the same manner as the exemplary main rotor assembly 340 of the aircraft 300 of FIG. 9). Notably, the output shaft 456 is mechanically coupled to the main rotor assembly 458 through a gearbox 460. However, in other exemplary embodiments, the output shaft 456 may be coupled to the main rotor assembly 458 in any other suitable manner.

Further, as previously stated, the exemplary hybrid electric propulsion system 400 additionally includes the electric machine 462, which may be configured as an electric motor/generator, and the energy storage unit 464. For the embodiment depicted, the electric machine 462 is directly mechanically coupled to the output shaft 456 of the gas turbine engine 402 (i.e., a rotor of the electric machine 462 is mounted to the output shaft 456). However, in other exemplary embodiments, the electric machine 462 may instead be mechanically coupled to the output shaft 456 in any other suitable manner, such as through a suitable gear train. Accordingly, it will be appreciated that the electric machine 462 may be configured to convert electrical power received to mechanical power (i.e., function as an electric motor), and further may be configured to receive mechanical power and convert such mechanical power to electrical power (i.e., function as an electric machine). Therefore, it will be appreciated that the electric machine 462 may be configured to increase or decrease an effective mechanical power output of the gas turbine engine 402, and more particularly of the output shaft 456 of the gas turbine engine 402 by adding power to, or extracting power from, the output shaft 456.

The energy storage unit 464 may be any component suitable for receiving, storing, and providing electrical power. For example, the energy storage unit 464 may be a battery pack, such as a plurality of lithium-ion batteries. In other embodiments, however, any other suitable chemistry of batteries may be utilized. Further, in at least certain exemplary embodiments, the energy storage unit 464 may be configured in substantially the same manner as the energy storage unit 55 described above (e.g., may store at least about fifty kilowatt-hours of electrical power), and the electric machine 462 may be configured as a relatively powerful electric machine also in substantially the same manner as the electric machine 56 described above. For example, the electric machine 462 may be configured to generate at least about seventy-five kilowatts of electrical power, or at least about one hundred horsepower of mechanical power. For example, in certain exemplary embodiments, the electric machine 462 may be configured to generate up to about one hundred and fifty kilowatts of electrical power and up to at least about two hundred horsepower of mechanical power, such as up to about one megawatt of electrical power and up to at least about one thousand three hundred horsepower of mechanical power.

Further, for the embodiment depicted, the controller 466 is operably connected to, e.g., the electric machine 462 and the energy storage unit 464 and configured to electrically connect these components and direct electrical power between these components. Particularly, for the embodiment depicted, the hybrid electric propulsion system 400 is configured to add power to, or extract power from, the gas turbine engine 402 using the electric machine 462 by way of an electrical connection between the electric machine 462 and the energy storage unit 464. More particularly, for the embodiment depicted, the hybrid electric propulsion system is operable between an electric charge mode, an electric discharge mode, and optionally a maintain mode. When operated in the electric charge mode, power may be extracted from the gas turbine engine 402 by operating the electric machine 462 as an electric machine, such that the electric machine 462 generates electrical power, and provides such electrical power to the energy storage unit 464. By contrast, when operated in the electric discharge mode, power may be provided to the gas turbine engine 402 by operating the electric machine 462 as an electric motor, such that the electric power provided from the energy storage unit 464 to the electric machine 462 provides additional mechanical power to the output shaft 456 of the turboshaft engine 402.

As will be appreciated, in certain exemplary embodiments, the hybrid electric propulsion system 400 may further include various power electronics components operable with the controller 466 (and/or a power bus, not labeled) to facilitate the controller 466 directing the electrical power to and/or from energy storage unit 464. These various power electronics components may further convert and/or condition electrical power provided between these components as necessary or desired.

It should also be appreciated that, although a particular aircraft and hybrid electric propulsion system have been illustrated and described, other configurations and/or aircraft may benefit from a hybrid electric propulsion system configured in accordance with one or more the above exemplary embodiments. For example, in other exemplary embodiments, the aircraft may be any other suitable rotary wing aircraft, typically referred to as a helicopter. Additionally, or alternatively, the aircraft may instead be configured as a vertical takeoff and landing aircraft, a fixed wing aircraft commonly referred to as an airplane (similar to the embodiment of FIGS. 1 through 8), etc.

Figure 11:
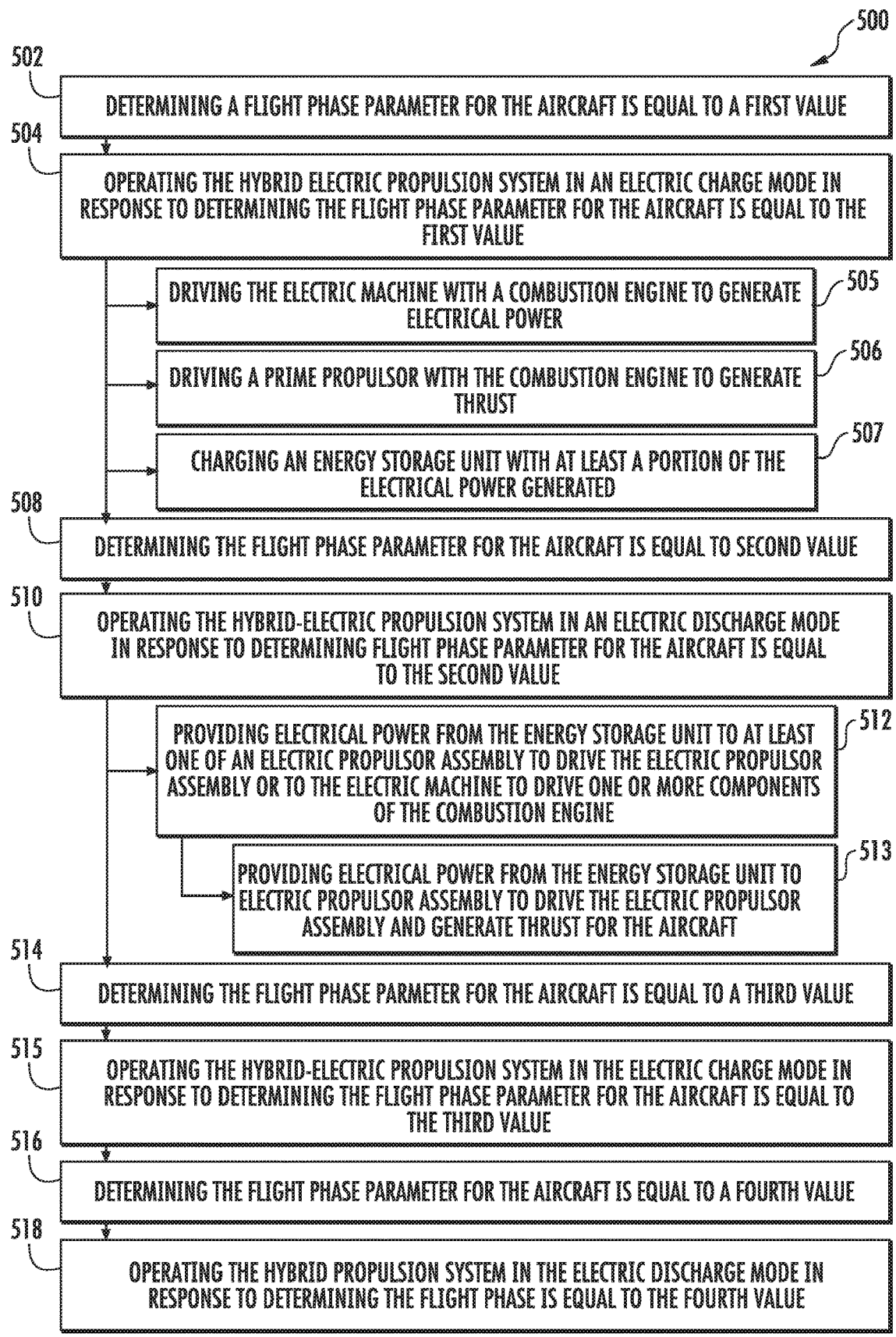
FIG. 11 is a flow diagram of a method for operating a hybrid-electric propulsion system for an aircraft in accordance with an exemplary aspect of the present disclosure.

Referring now to FIG. 11, a flow diagram of a method 500 for operating a hybrid-electric propulsion system for an aircraft is provided. In certain exemplary aspects, the hybrid-electric propulsion system operated by the method 500 may be configured in substantially the same manner as one or more of the exemplary hybrid-electric propulsion systems described above with reference to FIGS. 1 through 10.

As is depicted, the exemplary method 500 generally includes at (502) determining a flight phase parameter for the aircraft is equal to a first value, and at (504) operating the hybrid electric propulsion system in an electric charge mode in response to determining the flight phase parameter for the aircraft is equal to the first value at (502). More particularly, for the exemplary aspect depicted, operating the hybrid electric propulsion system in an electric charge mode at (504) includes at (505) driving the electric machine with a combustion engine to generate electrical power; at (506) driving a prime propulsor with the combustion engine to generate thrust; and at (507) charging an energy storage unit with at least a portion of the electrical power generated. Further, as is described in greater detail below, in certain exemplary aspects, the flight phase parameter value may correspond to one or more of a takeoff flight phase, a top of climb flight phase, a cruise flight phase, or a descent flight phase.

Moreover, referring still to FIG. 11, the exemplary method 500 further includes at (508) determining the flight phase parameter for the aircraft is equal to a second value. The second value is different than the first value. Further, the method 500 includes at (510) operating the hybrid-electric propulsion system in an electric discharge mode in response to determining flight phase parameter for the aircraft is equal to the second value at (508). Notably, for the exemplary aspect depicted, operating the hybrid-electric propulsion system in the electric discharge mode at (510) includes at (512) providing electrical power from the energy storage unit to at least one of an electric propulsor assembly to drive the electric propulsor assembly or to the electric machine to drive one or more components of the combustion engine. More specifically for the exemplary aspect of the method 500 depicted in FIG. 11, the hybrid electric propulsion system includes an electric propulsor assembly, and providing electrical power from the energy storage unit at (512) includes at (513) providing electrical power from the energy storage unit to electric propulsor assembly to drive the electric propulsor assembly and generate thrust for the aircraft, and more particularly, providing electrical power from the energy storage unit to an electric motor of the electric propulsor assembly, such that the electric motor may drive a propulsor of the electric propulsor assembly (e.g., a fan).

Additionally for the exemplary aspect depicted, the method 500 further includes at (514) determining the flight phase parameter for the aircraft is equal to a third value; at (515) operating the hybrid-electric propulsion system in the electric charge mode in response to determining the flight phase parameter for the aircraft is equal to the third value at (514); at (516) determining the flight phase parameter for the aircraft is equal to a fourth value; and at (518) operating the hybrid electric propulsion system in the electric discharge mode in response to determining the flight phase parameter is equal to the fourth value at (516).

It should be appreciated that operating the hybrid electric propulsion system in the electric charge mode at (515) may be similar to operating the hybrid electric propulsion system in the electric charge mode at (504), and similarly operating the hybrid electric propulsion system in the electric discharge mode at (518) may be similar to operating the hybrid electric propulsion system in the electric discharge mode at (510). Further, it should be appreciated that in certain exemplary aspects, determining the flight phase parameter for the aircraft is equal to the first value at (502), determining the flight phase parameter the aircraft is equal to the second value at (508), determining the flight phase parameter the aircraft is equal to the third value at (514), and determining the flight phase parameter the aircraft is equal to the fourth value at (518) may each occur sequentially.

Figure 12:
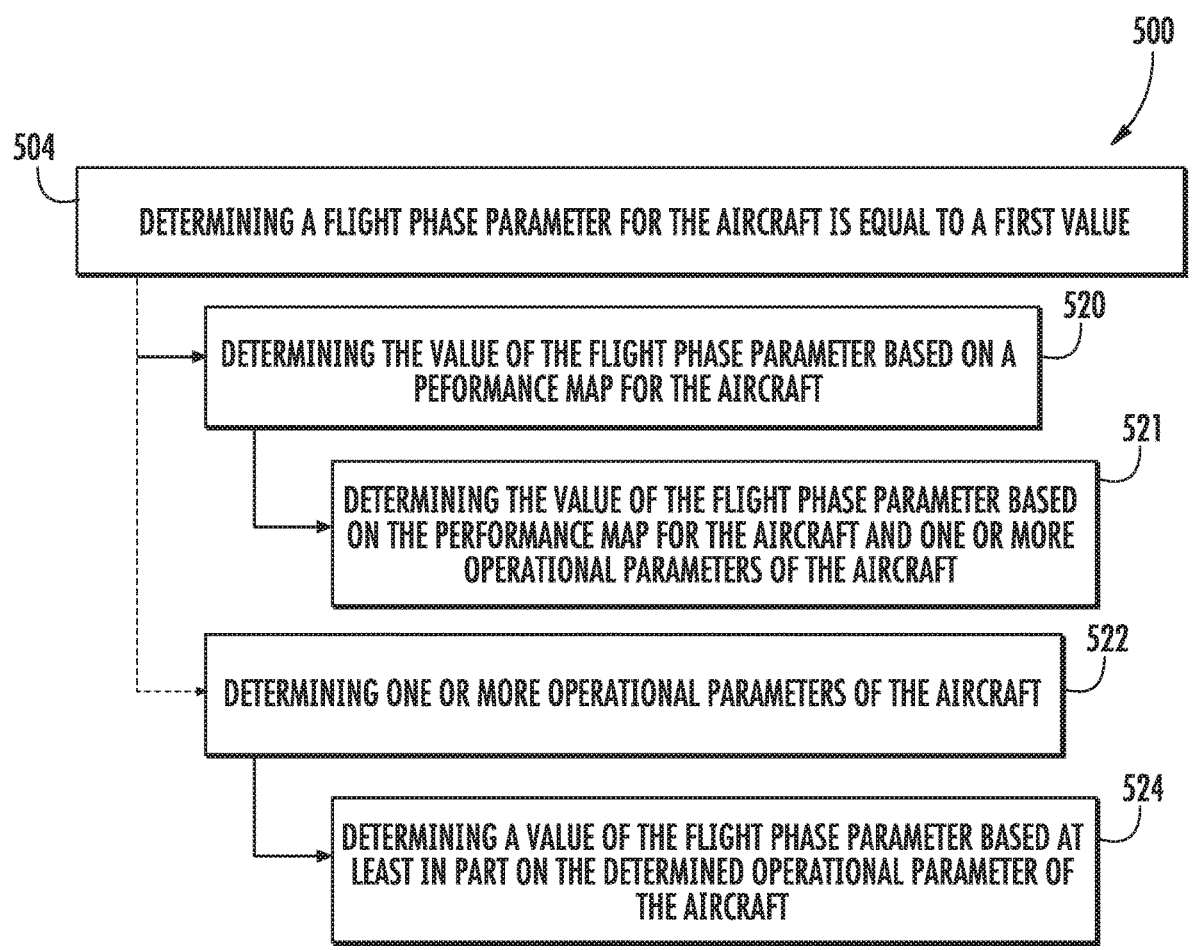
FIG. 12 is a flow diagram of a method for operating a hybrid-electric propulsion system for an aircraft in accordance with another exemplary aspect of the present disclosure.

In addition, it should be appreciated that in certain exemplary aspects determining the flight phase parameter is equal to the first value at (502) may include any suitable means for determining the flight phase parameter. For example, referring briefly to FIG. 12, exemplary aspects of the method 500 are depicted. More specifically, as is depicted, in certain exemplary aspects, determining the flight phase parameter is equal to the first value at (502) may include at (520) determining the value of the flight phase parameter based on a performance map for the aircraft. For example, the performance map for the aircraft may be a chart showing various flight phases for a particular flight over a span of time. Similarly, although not depicted in FIGS. 9 and 10, with such an exemplary aspect, determining the flight phase parameter is equal to the second value at (508), determining the flight phase parameter of the aircraft is equal to the third value at (514), and determining the flight phase parameter the aircraft is equal to the fourth value at (518) may each also include determining the value of the flight phase parameter based on a performance map for the aircraft.

Figure 13:
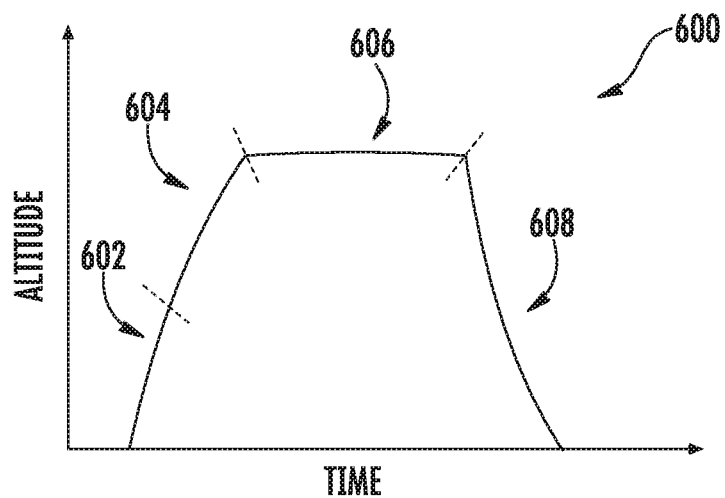
FIG. 13 is a schematic, exemplary view of a performance map for an aircraft including a hybrid-electric propulsion system in accordance with an exemplary embodiment of the present disclosure.

For example, referring now also to FIG. 13, a performance map 600 for the exemplary aircraft for a particular flight is depicted. The performance map 600 for the embodiment of FIG. 13 shows altitude (Y-axis) over time (X-axis). As is shown, the performance map identifies four distinct flight phases, namely: a takeoff flight phase 602, a top of climb flight phase 604, a cruise flight phase 606, and a descent phase 608. Accordingly, referring back also to the exemplary method 500 of FIG. 11, in certain exemplary aspects, the first value of the flight phase parameter may correspond to the aircraft being in the takeoff flight phase 602, the second value of the flight phase parameter may correspond to the aircraft being in the top of flight phase 604, the third value of the flight phase parameter may correspond to the aircraft being in a cruise flight phase 606, and the fourth value of the flight phase parameter may correspond to the aircraft being in the descent flight phase 608. Accordingly, in such an exemplary aspect, the hybrid-electric propulsion system may charge the energy storage unit during at least a portion of the takeoff flight phase 602, may discharge electrical power from the energy storage unit during a top of flight phase 604, may re-charge energy storage unit during at least a portion of the cruise flight phase 606, and further made discharge electrical power from the energy storage unit during the descent flight phase 608.

Notably, it should be appreciated that in certain exemplary aspects, determining the value of the flight phase parameter based on a performance map for the aircraft at (520) may further include at (521) determining the value of the flight phase parameter based on the performance map for the aircraft and one or more operational parameters of the aircraft, such as altitude, flight duration, etc.

Additionally, or alternatively, in other exemplary aspects, determining the flight phase parameter for the aircraft is equal to the first value at (502) may include any other suitable steps or methods. For example, referring again to FIG. 12, in certain exemplary aspects, as is indicated by the phantom lead lines, determining the flight phase parameter for the aircraft is equal to the first value at (502) may include at (522) determining one or more operational parameters of the aircraft, and at (524) determining a value of the flight phase parameter based at least in part on the determined operational parameter of the aircraft. For example, in certain exemplary aspects, the one or more operational parameters of the aircraft may include one or more of an altitude of the aircraft, a change in altitude of the aircraft, an airspeed of the aircraft, a change in airspeed of the aircraft, a duration of the current flight of the aircraft, or any other suitable operational parameter which may be indicative of a flight phase of the aircraft.

Figure 14:
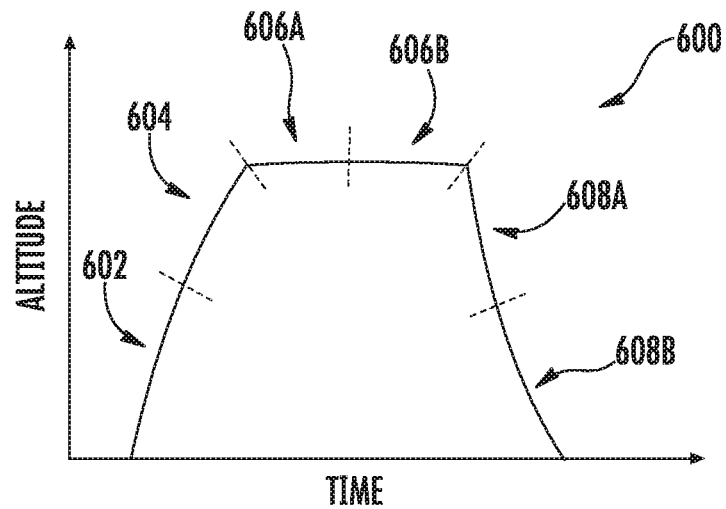
FIG. 14 is a schematic, exemplary view of a performance map for an aircraft including a hybrid-electric propulsion system in accordance with another exemplary embodiment of the present disclosure.

It should further be appreciated, however, that in other exemplary aspects, determining the flight phase parameter is equal to the first value, second value, third value and fourth value at (502), (508), (514), and (516) may each also include determining a value of the flight phase parameter based at least in part on a determined operational parameter of the aircraft, and further may not occur sequentially and instead may occur in any other suitable order. For example, in certain exemplary aspects, the flight phase parameter being equal to the first value may correspond to the aircraft being in a cruise flight phase 606, and the flight phase parameter being equal to the second value may correspond to the aircraft being in a descent flight phase 608. Additionally, or alternatively, in still other exemplary aspects, the flight phase parameter may be determined to have any other suitable value. For example, in other exemplary aspects, the flight phase parameter being equal to the first value may correspond to the aircraft being in a first cruise flight phase, and the flight phase parameter being equal to the second value may correspond to the aircraft being a second cruise flight phase. The second cruise flight phase may be sequential with the first cruise flight phase. For example, referring now briefly to FIG. 14, providing a performance map 600 for an aircraft in accordance with another exemplary embodiment aspect, the first and second values of the flight phase parameter correspond to sequential phases of the cruise portion of the (i.e., a first cruise flight phase 606A and a second cruise flight phase 606B). Additionally, it will be appreciated that for the exemplary aspect depicted in FIG. 14, the aircraft further defines two descent flight phases 608A, 608B. Accordingly, it will be appreciated that in other exemplary aspects, the aircraft may define any suitable number of flight phases. Additionally, it should be appreciated, that although not described with reference to FIG. 11 through 14, in other exemplary aspects, the method 500 may further include operating the hybrid electric propulsion in a maintain mode in response to one or more of the values of the flight phase parameter.

Figure 15:
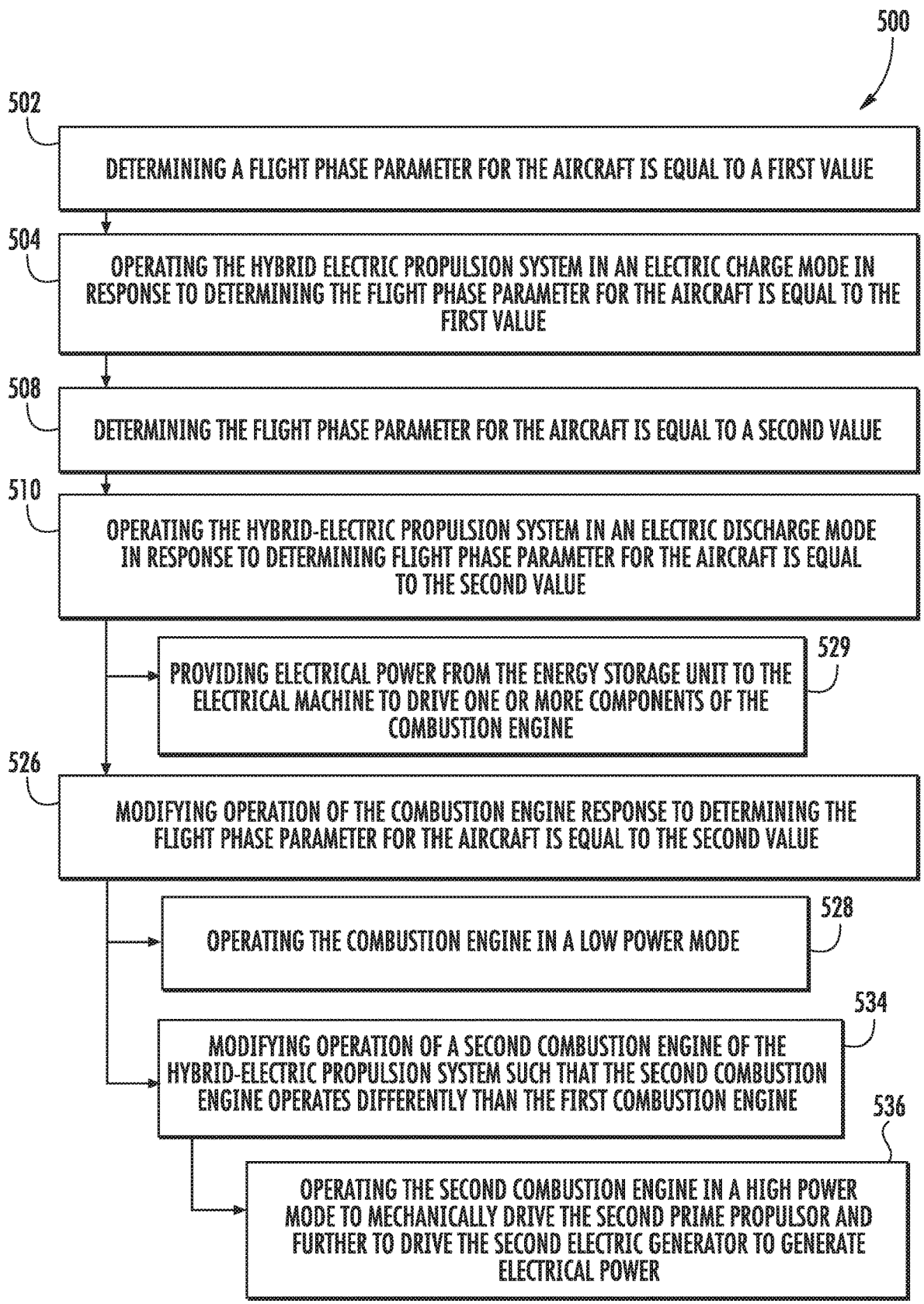
FIG. 15 is a flow diagram of a method for operating a hybrid-electric propulsion system for an aircraft in accordance with another exemplary aspect of the present disclosure.

Referring now to FIG. 15, another exemplary aspect of the present disclosure is depicted. More specifically, FIG. 15 provides a flow diagram of another exemplary aspect of the exemplary method 500 described above with reference to FIG. 11. The exemplary method 500 of FIG. 15 may accordingly be similar to the exemplary method 500 of FIG. 11. For example, the method 500 of FIG. 15 generally includes at (502) determining a flight phase parameter for the aircraft is equal to a first value, and at (504) operating the hybrid electric propulsion system in an electric charge mode in response to determining the flight phase parameter for the aircraft is equal to the first value at (502). Moreover, the exemplary aspect of the method 500 depicted in FIG. 15 further includes at (508) determining the flight phase parameter for the aircraft is equal to a second value, and at (510) operating the hybrid-electric propulsion system in an electric discharge mode in response to determining flight phase parameter for the aircraft is equal to the second value at (508).

However, for the exemplary aspect of FIG. 15, the exemplary method further includes modifying operation of the combustion engine in response to determining a value of the flight phase parameter the aircraft. More specifically, for the exemplary aspect depicted, the exemplary method 500 includes at (526) modifying operation of the combustion engine response to determining the flight phase parameter for the aircraft is equal to the second value at (508).

For example, in the exemplary aspect depicted, modifying operation of the combustion engine at (526) includes at (528) operating the combustion engine in a low power mode. Operating the combustion engine in the low power mode at (528) may include operating the combustion engine in an idle or sub-idle mode (e.g., at a rotational speed less than or equal to about fifty percent of a maximum rotational speed, such as less than or equal to about forty percent of a maximum rotational speed). In certain exemplary aspects, such may be done to generate a minimum amount of thrust with the prime propulsor, or simply to operate the combustion engine more efficiently. The minimum amount of thrust may be a thrust less than or equal to about twenty-five percent of a maximum amount thrust.

Additionally, or alternatively, in certain exemplary aspects, as previously discussed, the method 500 includes at (510) operating the hybrid electric propulsion system in the electric discharge mode in response to determining the flight phase parameter for the aircraft is equal to the second value. For the exemplary aspect of the method 500 depicted in FIG. 15, operating the hybrid electric propulsion system in the electric discharge mode at (510) further includes at (529) providing electrical power from the energy storage unit to the electric machine to drive one or more components of the combustion engine. In such a manner, the electric machine may supplement an output power of the combustion engine and provide power to drive the prime propulsor when the combustion engine is operated in the low power mode at (528).

Further, for the exemplary aspect depicted, the combustion engine is a first combustion engine, the prime propulsor is a first prime propulsor, and the electric machine is a first electric machine. The hybrid electric propulsion system further includes a second combustion engine, a second prime propulsor, and a second electric machine. The second combustion engine is mechanically coupled to the second prime propulsor, and is further mechanically coupled to the second electric machine.

In certain exemplary aspects, the second combustion engine may be operated in the same manner as the first combustion engine. However, the exemplary aspect of the method 500 depicted in FIG. 15, the second combustion engine is operated in a complementary fashion to the first combustion engine. More specifically, for the exemplary aspect of the method 500 depicted in FIG. 15, modifying operation of the first combustion engine at (526) further includes at (534) modifying operation of the second combustion engine of the hybrid-electric propulsion system such that the second combustion engine operates differently than the first combustion engine (e.g., at a different rotational core speed), and more specifically, at (536) operating the second combustion engine in a high power mode to mechanically drive the second prime propulsor and further to drive the second electric machine to generate electrical power. For example, operating the second combustion engine in the high power mode at (536) may include operating the second combustion engine at a rotational speed at least fifty percent greater than a rotational speed of the first combustion engine when operated in the low power mode at (528) (the rotational speed referring to a core speed, N2). Notably, despite operating the second combustion engine differently than the first combustion engine, an effective power output of the second combustion engine may be substantially equal to an effective power output of the first combustion engine, with the differential being made up with the respective electric machines. The effective power output may refer to an effective power provided to, e.g., a respective prime propulsor.

It should be appreciated that operating a hybrid-electric propulsion system in such an exemplary manner may allow for more efficient operation of the hybrid-electric propulsion system. For example, in one exemplary aspect, in response to determining the aircraft is in a descent flight phase, the hybrid-electric propulsion system may power the electric propulsor assembly at least in part using stored energy from the electric storage unit, may effectively shut down one of the combustion engines (e.g., one of the turbofan engines), and may continue to operate the second combustion engine at a relatively high power, where the second combustion engine operates most efficiently.

Figure 16:
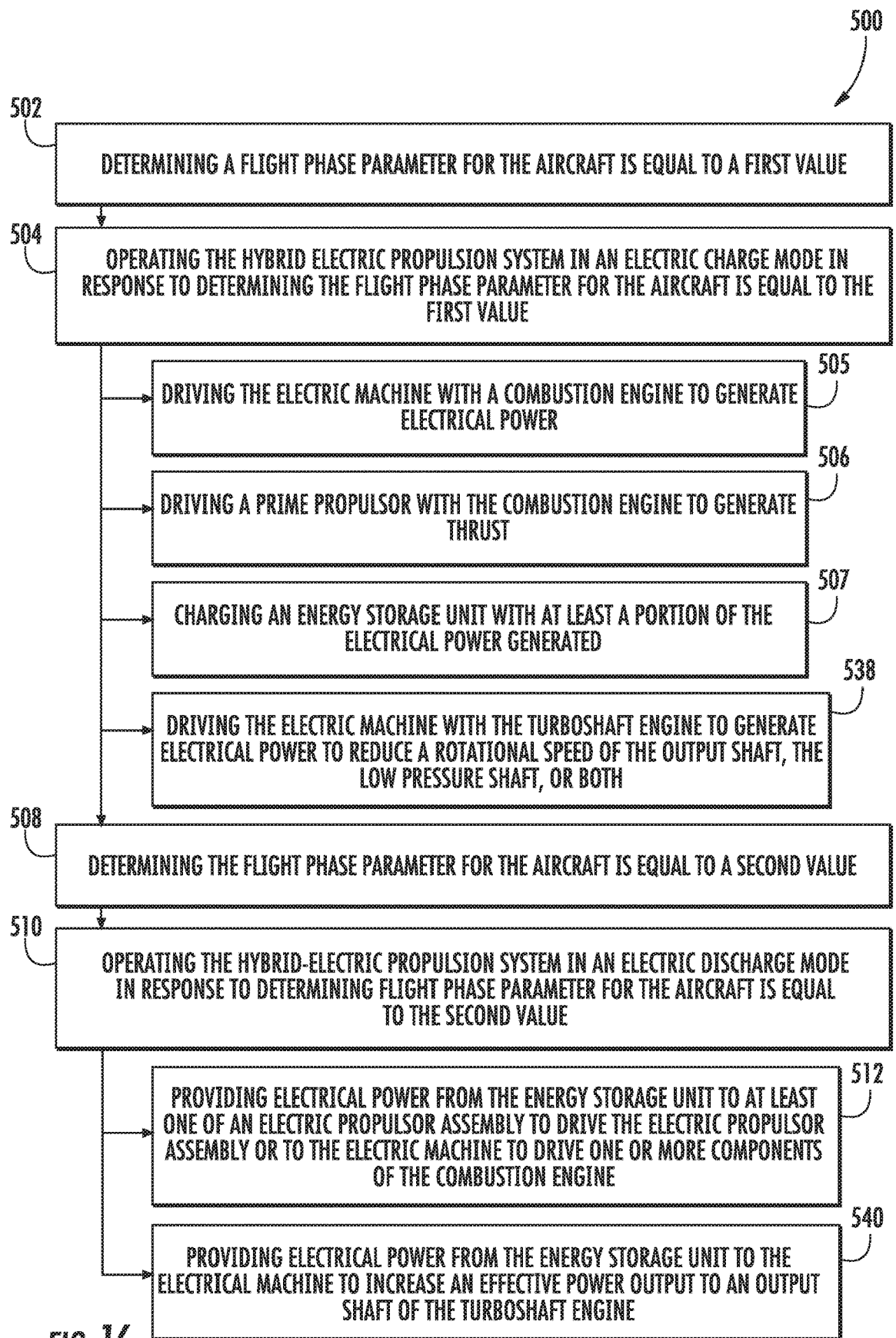
FIG. 16 is a flow diagram of a method for operating a hybrid-electric propulsion system for an aircraft in accordance with another exemplary aspect of the present disclosure.

Referring now to FIG. 16, another exemplary aspect of the present disclosure is depicted. The exemplary aspect of the method 500 depicted in FIG. 16 may be most suitable for operation with the exemplary hybrid electric propulsion system of FIGS. 9 and 10. However, in other exemplary embodiments, the exemplary aspect of the method 500 depicted in FIG. 16 may additionally, or alternatively, be operable with any other suitable hybrid electric propulsion system.

More specifically, FIG. 16 provides a flow diagram of another exemplary aspect of the exemplary method 500 described above with reference to FIG. 11. The exemplary method 500 of FIG. 16 may accordingly be similar to the exemplary method 500 of FIG. 11. For example, the method 500 of FIG. 16 generally includes at (502) determining a flight phase parameter for the aircraft is equal to a first value, and at (504) operating the hybrid electric propulsion system in an electric charge mode in response to determining the flight phase parameter for the aircraft is equal to the first value at (502). Additionally, operating the hybrid electric propulsion system in an electric charge mode at (504) includes at (505) driving the electric machine with a combustion engine to generate electrical power; at (506) driving a prime propulsor with the combustion engine to generate thrust; and at (507) charging an energy storage unit with at least a portion of the electrical power generated.

Moreover, the exemplary aspect of the method 500 depicted in FIG. 16 further includes at (508) determining the flight phase parameter for the aircraft is equal to a second value, and at (510) operating the hybrid-electric propulsion system in an electric discharge mode in response to determining the flight phase parameter for the aircraft is equal to the second value at (508). Also for the exemplary aspect depicted, operating the hybrid-electric propulsion system in the electric discharge mode at (510) includes at (512) providing electrical power from the energy storage unit to at least one of an electric propulsor assembly to drive the electric propulsor assembly or to the electric machine to drive one or more components of the combustion engine.

However, for the exemplary aspect of the method 500 depicted in FIG. 16, the hybrid electric propulsion system may be configured in a similar manner to the exemplary hybrid electric propulsion system 600 described above with reference to FIG. 10. Accordingly, for the exemplary aspect of the method 500 depicted in FIG. 16, the aircraft is a helicopter, the combustion engine is a turboshaft engine, and the hybrid electric propulsion system may not include an electric propulsor assembly. Further, the turboshaft engine may include an output shaft and a low pressure shaft mechanically coupled to the output shaft. With such an exemplary aspect, operating the hybrid electric propulsion system in an electric charge mode at (504) further includes at (538) driving the electric machine with the turboshaft engine to generate electrical power and to reduce a rotational speed of the output shaft, the low pressure shaft, or both. For example, operating the electric machine in such a manner may act as a drag on the output shaft, the low pressure shaft, or both to reduce a rotational speed of such component.

Further, for the exemplary aspect of FIG. 16, operating the hybrid-electric propulsion system in the electric discharge mode at (510) includes at (540) providing electrical power from the energy storage unit to the electric machine to increase an effective power output to an output shaft of the turboshaft engine. For example, in certain exemplary aspects, providing electrical power from the energy storage unit to the electric machine may include providing electrical power from the energy storage unit to the electric machine to drive the output shaft of the turboshaft engine. Alternatively, however, in other exemplary aspects, providing electrical power from the energy storage unit to the electric machine may include driving a core of the turboshaft engine, which as will be appreciated, may increase an airflow through the turboshaft engine, correspondingly increasing an effective power output to the output shaft of the turboshaft engine. Accordingly, operating the electric machine in such a manner may act as a boost to the output shaft, the LP shaft, or both to increase an effective power output to the output shaft.

It should accordingly be appreciated that for the exemplary aspect of the method 500 depicted in FIG. 16, the first value may correspond to the aircraft being in a descent flight phase, and the second value may correspond to the aircraft being in an ascent flight phase. More particularly, it will be appreciated that when in the descent flight phase, the turboshaft engine is typically dropped to a "no-load" condition, and the main rotor assembly may be rotated substantially completely by an airflow through such main rotor assembly. In such a manner, during the descent flight phase, the main rotor assembly rotates at a maximum main rotor speed (which must be accommodated). The no-load condition generally refers to a condition in which the engine is operated at a minimum power level, such as on a minimum fuel flow schedule or at minimum sustainable speed. Accordingly, in order to reduce the maximum main rotor speed, at least in certain exemplary aspects, the method 500 may operate the hybrid electric propulsion system in the electric charge mode, such that the electric machine converts mechanical rotational power from, e.g., the output shaft or low pressure shaft of the turboshaft engine, to electrical power, acting as a drag on one or both of the output shaft and low pressure shaft to reduce a rotational speed of such output shaft or low pressure shaft.

By contrast, when the aircraft switches from a descent flight phase to an ascent flight phase, the turbomachine must be rapidly re-accelerated (e.g., from the no-load condition) in order to start adding power to the output shaft, and rotating the main rotor assembly. Due to an acceleration schedule of the turboshaft engine, it may not be able to re-accelerate as quickly as desired. Accordingly, in at least certain exemplary aspects of the method 500, the method 500 may operate the hybrid electric propulsion system in the electric discharge mode during such a flight phase, such that electrical power is provided to the electric machine, which may in turn, may convert such electrical power to substantially instantaneously provide additional mechanical rotational power for the output shaft, or low pressure shaft, of the turboshaft engine, increasing an effective power output of the turboshaft engine and a responsiveness of the turboshaft engine. Alternatively, the electric machine may be coupled to a core of the turboshaft engine, in which case, the electric machine may increase an airflow through the core, which in turn may more rapidly re-accelerate the low pressure turbine and a low pressure shaft to increase an output power to the main rotor assembly.

Figure 17:
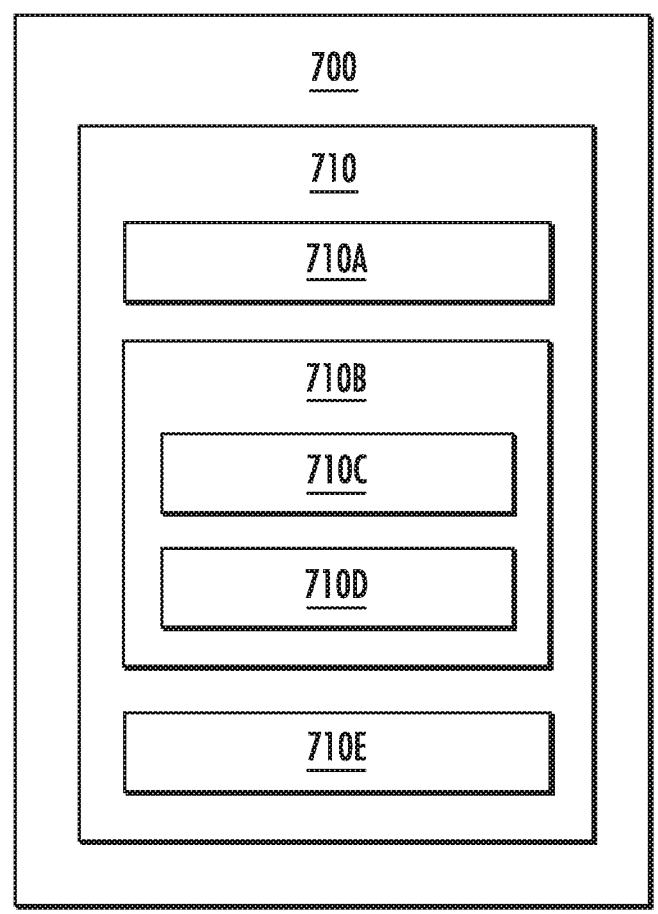
FIG. 17 is a computing system according to example aspects of the present disclosure.

Referring now to FIG. 17, an example computing system 700 according to example embodiments of the present disclosure is depicted. The computing system 700 can be used, for example, as a controller 72 in a hybrid electric propulsion system 50. The computing system 700 can include one or more computing device(s) 710. The computing device(s) 710 can include one or more processor(s) 710A and one or more memory device(s) 710B. The one or more processor(s) 710A can include any suitable processing device, such as a microprocessor, microcontroller, integrated circuit, logic device, and/or other suitable processing device. The one or more memory device(s) 710B can include one or more computer-readable media, including, but not limited to, non-transitory computer-readable media, RAM, ROM, hard drives, flash drives, and/or other memory devices.

The one or more memory device(s) 710B can store information accessible by the one or more processor(s) 710A, including computer-readable instructions 710C that can be executed by the one or more processor(s) 710A. The instructions 710C can be any set of instructions that when executed by the one or more processor(s) 710A, cause the one or more processor(s) 710A to perform operations. In some embodiments, the instructions 710C can be executed by the one or more processor(s) 710A to cause the one or more processor(s) 710A to perform operations, such as any of the operations and functions for which the computing system 700 and/or the computing device(s) 710 are configured, the operations for operating a hybrid electric propulsion system of an aircraft (e.g, method 500), as described herein, and/or any other operations or functions of the one or more computing device(s) 710. In such a manner, the exemplary method 500 above may be a computer-implemented method, such that one or more of the steps of the method 500 may be carried out using one or more computing devices, such as one or more of the computing devices 710.

The instructions 710C can be software written in any suitable programming language or can be implemented in hardware. Additionally, and/or alternatively, the instructions 710C can be executed in logically and/or virtually separate threads on processor(s) 710A. The memory device(s) 710B can further store data 710D that can be accessed by the processor(s) 710A. For example, the data 710D can include data indicative of operational parameters of the aircraft and/or the hybrid electric propulsion system, data indicative of performance maps for the aircraft and/or the hybrid electric propulsion system, any user input, such as flight phase data, and/or any other data and/or information described herein.

The computing device(s) 710 can also include a network interface 710E used to communicate, for example, with the other components of system 700 (e.g., via a network). The network interface 710E can include any suitable components for interfacing with one or more network(s), including for example, transmitters, receivers, ports, controllers, antennas, and/or other suitable components. One or more external display devices (not depicted) can be configured to receive one or more commands from the computing device(s) 710.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a hybrid-electric propulsion system for an aircraft, the method comprising:
   determining a flight phase parameter for the aircraft is equal to a first value;
   operating the hybrid-electric propulsion system in an electric charge mode in response to determining the flight phase parameter for the aircraft is equal to the first value, wherein operating the hybrid-electric propulsion system in the electric charge mode comprises driving the electric machine with a combustion engine to generate electrical power, driving a prime propulsor with the combustion engine to generate thrust, and charging an energy storage unit with at least a portion of the electrical power generated;
   determining the flight phase parameter for the aircraft is equal to a second value different from the first value;
   operating the hybrid-electric propulsion system in an electric discharge mode in response to determining the flight phase parameter for the aircraft is equal to the second value, wherein operating the hybrid-electric propulsion system in the electric discharge mode comprises providing electrical power from the energy storage unit to at least one of an electric propulsor assembly to drive the electric propulsor assembly or to the electric machine to drive one or more components of the combustion engine; and
   modifying operation of the combustion engine in response to determining the flight phase parameter for the aircraft is equal to the second value, wherein modifying operation of the combustion engine comprises operating the combustion engine in an idle or sub-idle mode.

2. The method of claim 1, wherein operating the hybrid-electric propulsion system in the electric discharge mode comprises providing electrical power from the energy storage unit to an electric motor of the electric propulsor assembly, the electric motor drivingly connected to a propulsor of the electric propulsor assembly.

3. The method of claim 1, wherein the first value corresponds to the aircraft being in a takeoff flight phase, and wherein the second value corresponds to the aircraft being in a top of climb flight phase.

4. The method of claim 1, wherein the first value corresponds to the aircraft being in a first cruise flight phase, and wherein the second value corresponds to the aircraft being in a second cruise flight phase.

5. The method of claim 1, wherein the first value corresponds to a cruise flight phase, and wherein the second value corresponds to a descent flight phase.

6. The method of claim 1, wherein modifying operation of the combustion engine comprises operating the combustion engine in the idle mode.

7. The method of claim 1, wherein determining the flight phase parameter for the aircraft is equal to the first value comprises determining the value of the flight phase parameter based on a performance map for the aircraft.

8. The method of claim 1, wherein the energy storage unit comprises one or more batteries.

9. The method of claim 1, further comprising:
   determining the flight phase parameter for the aircraft is equal to a third value;
   operating the hybrid-electric propulsion system in the electric charge mode in response to determining the flight phase parameter for the aircraft is equal to the third value;
   determining the flight phase parameter for the aircraft is equal to a fourth value; and
   operating the hybrid-electric propulsion system in the electric discharge mode in response to determining the flight phase parameter for the aircraft is equal to the fourth value.

10. The method of claim 9, wherein the first value corresponds to the aircraft being in a takeoff flight phase, wherein the second value corresponds to the aircraft being in a top of climb flight phase, wherein the third value corresponds to the aircraft being in a cruise flight phase, and wherein the fourth value corresponds to the aircraft being in a descent flight phase.

11. The method of claim 1, wherein modifying operation of the combustion engine comprises operating the combustion engine in the sub-idle mode.

12. The method of claim 11, wherein the combustion engine is a first combustion engine, wherein the prime propulsor is a first prime propulsor, wherein the electric machine is a first electric machine, and wherein modifying operation of the first combustion engine further comprises operating a second combustion engine of the hybrid-electric propulsion system at a rotational speed at least fifty percent greater than a rotational speed of the first combustion engine, the second combustion engine being operated to mechanically drive a second prime propulsor and further to drive a second electric machine to generate electrical power.

13. The method of claim 1, wherein determining the flight phase parameter for the aircraft is equal to the first value comprises:
    determining one or more operational parameters of the aircraft; and
    determining a value of the flight phase parameter based at least in part on the determined operational parameter of the aircraft.

14. The method of claim 13, wherein the one or more operational parameters of the aircraft includes one or more of an altitude of the aircraft, a change in altitude of the aircraft, an air speed of the aircraft, a change in airspeed of the aircraft, or a duration of a current flight of the aircraft.

15. The method of claim 1, wherein the aircraft is a helicopter, wherein the combustion engine is a turboshaft engine, and wherein the prime propulsor is a main rotor assembly.

16. The method of claim 15, wherein operating the hybrid-electric propulsion system in the electric discharge mode comprising providing electrical power from the energy storage unit to the electric machine to increase an effective power output of an output shaft of the turboshaft engine.

17. The method of claim 15, wherein the first value corresponds to the aircraft being in a descent flight phase, wherein the second value corresponds to the aircraft being in an ascent flight phase.

18. A hybrid-electric propulsion system for an aircraft comprising:
    an electric machine;
    prime propulsor;
    a combustion engine mechanically coupled to the prime propulsor for driving the prime propulsor and further coupled to the electric machine;
    an electrical energy storage unit electrically connectable to the electric machine;
    an electric propulsor assembly electrically connectable to the electrical energy storage unit, the electric machine, or both; and
    a controller comprising memory and one or more processors, the memory storing instructions that when executed by the one or more processors cause the hybrid-electric propulsion system to perform functions, the functions including:
        determining a flight phase parameter for the aircraft is equal to a first value;
        operating the hybrid-electric propulsion system in an electric charge mode in response to determining the flight phase parameter for the aircraft is equal to the first value, wherein operating the hybrid-electric propulsion system in the electric charge mode comprises driving the electric machine with the combustion engine to generate electrical power, driving the prime propulsor with the combustion engine to generate thrust, and charging the energy storage unit with at least a portion of the electrical power generated;
        determining the flight phase parameter for the aircraft is equal to a second value different from the first value; and
        operating the hybrid-electric propulsion system in an electric discharge mode in response to determining the flight phase parameter for the aircraft is equal to the second value, wherein operating the hybrid-electric propulsion system in the electric discharge mode comprises providing electrical power from the energy storage unit to the electric propulsor assembly to drive the electric propulsor assembly;
        modifying operation of the combustion engine in response to determining the flight phase parameter for the aircraft is equal to the second value, wherein modifying operation of the combustion engine comprises operating the combustion engine in a sub-idle mode.

19. A method of operating a hybrid-electric propulsion system for an aircraft, the method comprising:
    determining a flight phase parameter for the aircraft is equal to a first value;
    operating the hybrid-electric propulsion system in an electric charge mode in response to determining the flight phase parameter for the aircraft is equal to the first value, wherein operating the hybrid-electric propulsion system in the electric charge mode comprises driving the electric machine with a combustion engine to generate electrical power, driving a prime propulsor with the combustion engine to generate thrust, and charging an energy storage unit with at least a portion of the electrical power generated;
    determining the flight phase parameter for the aircraft is equal to a second value different from the first value; and
    operating the hybrid-electric propulsion system in an electric discharge mode in response to determining the flight phase parameter for the aircraft is equal to the second value, wherein operating the hybrid-electric propulsion system in the electric discharge mode comprises providing electrical power from the energy storage unit to at least one of an electric propulsor assembly to drive the electric propulsor assembly or to the electric machine which supplements an output power of the combustion engine and provides power to drive one or more components of the combustion engine while the combustion engine is operated in a low power mode.

20. The method of claim 19, wherein operating the combustion engine in a low power mode comprises operating the combustion engine in an idle or sub-idle mode.

* * * * *